United States Patent
Endo et al.

(10) Patent No.: US 7,602,800 B2
(45) Date of Patent: Oct. 13, 2009

(54) PON SYSTEM

(75) Inventors: Hideki Endo, Hachioji (JP); Masahiko Mizutani, Kokubunji (JP); Masayuki Takase, Kokubunji (JP); Kenichi Sakamoto, Kokubunji (JP); Yoshihiro Ashi, Yokohama (JP); Takayuki Kanno, Yokohama (JP); Nobuyuki Yamamoto, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 423 days.

(21) Appl. No.: 11/702,155

(22) Filed: Feb. 5, 2007

(65) Prior Publication Data

US 2007/0237177 A1    Oct. 11, 2007

(30) Foreign Application Priority Data

Apr. 10, 2006    (JP) ............................. 2006-107790

(51) Int. Cl.
   *H04L 12/28* (2006.01)
(52) U.S. Cl. .................. 370/420; 370/398; 370/395.41; 370/396; 398/58
(58) Field of Classification Search ................ 370/420, 370/395.41, 412, 422, 398; 398/58
   See application file for complete search history.

(56) References Cited

U.S. PATENT DOCUMENTS

| 7,020,162 | B2 * | 3/2006 | Iwasaki et al. ............... 370/468 |
| 7,164,861 | B2 * | 1/2007 | Takachio et al. ............... 398/70 |
| 7,180,910 | B2 * | 2/2007 | Kim et al. .................... 370/468 |
| 2004/0010617 | A1 | 1/2004 | Akahane et al. |
| 2004/0062256 | A1 * | 4/2004 | Takeuchi et al. ............. 370/401 |
| 2004/0146301 | A1 * | 7/2004 | Choi et al. ..................... 398/58 |
| 2005/0074238 | A1 * | 4/2005 | Sung et al. ..................... 398/58 |

FOREIGN PATENT DOCUMENTS

| JP | 2004-48146 | 2/2004 |
| JP | 2004-153505 | 5/2004 |
| JP | 2004-159203 | 6/2004 |

OTHER PUBLICATIONS

IEEE Standards for Local and Metropolitan Area Networks: Supplements to Carrier Sense Multiple Access with Collision Detection (CSMA/CD) Access Method and Physical Layer Specifications; Specification for 802.3 Full Duplex Operation *and* Physical Layer Specification for 100 Mb/s Operation on Two Pairs of Category 3 or Better Balanced Twisted Pair Cables (100BASE-T2), 1997.

* cited by examiner

*Primary Examiner*—Ricky Ngo
*Assistant Examiner*—Dewanda Samuel
(74) *Attorney, Agent, or Firm*—Mattingly & Malur, P.C.

(57) ABSTRACT

Disclosed herewith is a PON system and a bandwidth controlling method capable of controlling congestion with use of an upstream bandwidth in a PON section efficiently when congestion occurs in a gateway (GW) connected to an OLT. An OLT connected to a plurality of ONUs through a passive optical network (PON) and to a gateway (GW) through a communication line, when receiving a congestion occurrence notice indicating a congestion occurred output number from a GW, identifies the identifier of the ONU that is using a GW output line having the congestion output port number and shifts the bandwidth controlling of the PON section in a normal mode for allocating a bandwidth to each ONU normally to that in a bandwidth suppression mode for allocating a congestion time allowable bandwidth that is less than the current bandwidth to the ONU having the identified ONU identifier and a bandwidth to each of other ONUs according to its transmission queue length.

10 Claims, 20 Drawing Sheets

BACK PRESSURE CONTROL FRAME

FIG. 5

BANDWIDTH CONTROL TABLE 120

| BANDWIDTH CONTROL ID 121 | CONGESTION TIME ALLOWABLE BANDWIDTH 122 | MAX CONTROL BANDWIDTH 123 | ALLOCATED BANDWIDTH 124 | SOURCE QUEUE LENGTH 125 | CONGESTION FLAG 126 | CARRY-OVER BANDWIDTH 127 |
|---|---|---|---|---|---|---|
| Alloc-ID#1 | Bcon1 | Bmax1 | BW1 | SQ1 | 1 | BWcrr1 |
| Alloc-ID#2 | Bcon2 | Bmax2 | BW2 | SQ2 | 0 | BWcrr2 |
| ...... | ...... | ...... | ...... | ...... | ...... | ...... |
| Alloc-ID#N | BconN | BmaxN | BWN | SQN | 1 | BWcrrN |

FIG. 6

CONGESTION CONTROL TABLE  130

| GW OUTPUT PORT NO. (131) | CONGESTION FLAG (132) | BANDWIDTH CONTROL ID (133) |
|---|---|---|
| PN#0 | 0 | Alloc-ID#1, Alloc-ID#5,··· |
| PN#1 | 1 | Alloc-ID#2, Alloc-ID#8,··· |
| ······ | ······ | ······ |

PON SYSTEM

CLAIM OF PRIORITY

The present application claims priority from Japanese application JP 2006-107790 filed on Apr. 10, 2006, the content of which is hereby incorporated by reference into this application.

FIELD OF THE INVENTION

The present invention relates to a passive optical network (PON) system comprising an optical line terminal (OLT) and plural optical network units (ONUs) connected to each other through a passive optical network (PON), more particularly to a method for controlling the bandwidth of a PON section when line congestion occurs in any of the output ports of a frame transfer device connected to the OLT.

BACKGROUND OF THE INVENTION

A carrier network for providing services of connection to the Internet consists of an access network for holding a plurality of subscribers directly and a relay network (hereunder, to be referred to as a metro network) for bundling a plurality of access networks. And a passive optical network (PON) is one of such access network types.

A PON is a network system for connecting an OLT and a plurality of ONUs to each other through an optical fiber network provided with a function for branching an optical signal and enabling each ONU to transmit data to the OLT in a time division manner according to its access right (data transmission time band) information notified from the OLT. The PON branches an optical fiber connected to an OLT into a plurality of branch line optical fibers with use of an optical splitter (optical coupler) to enable an optical fiber section between an optical splitter and the OLT to be shared by a plurality of ONUs when an ONU disposed in the user's house is connected to a branch line optical fiber. Thus the PON can reduce the expenses for laying the optical fiber and hold many user terminals through the ONU.

The OLT of the PON system is connected to a metro network through, for example, a gateway (GW). The GW is a frame transfer device for holding a plurality of OLTs and transferring each variable length frame between each OLT and the metro network according to its header. In addition to the GW for housing the OLT, the metro network also includes another GW for housing, for example, an ISP network. Consequently, each user terminal connected to an ONU can access the Internet through the OLT, GW, and ISP network.

There are some types of PONs such as B-PON (Broadband PON) for transmitting information with use of fixed length ATM cells in an optical fiber section (PON section), G-PON (Gigabit PON) capable of realizing gigabit class high speed data transfer, and GE-PON (Giga-Ethernet PON) preferred to Ethernet (trade mark) services.

In the case of the G-PON capable of transferring variable length frames, an OLT generates GTC (G-PON Transmission Convergence) downstream frames specific to a PON section and maps GEM (G-PON Encapsulation Mode) frames including packet data addressed to each ONU in the payload of each GTC downstream frame. The GTC downstream frames are broadcast to a plurality of branch line optical fibers through an optical splitter (optical coupler). Each ONU checks the ONU identification information (ONU port ID) of the destination indicated by the header part of the GEM frame extracted from the GTC payload to receive the packet data addressed to itself selectively, then transfers the data to the subject target user terminal.

The PON OLT has a DBA (Dynamic Bandwidth Allocation) function for allocating a data transmission time band (time slot) for each ONU according to an amount of accumulated transmission data (transmission queue length) in each ONU. In the DBA, a time slot is allocated to one or a plurality of ONUs in a predetermined cycle $\Delta T$. Consequently, the maximum number of time slots to be allocated to one ONU becomes $\Delta T$. If B is assumed as a bandwidth of an optical fiber line, therefore, the maximum bandwidth B (limit) to be allocated to one ONU becomes $\Delta T \times B$. The OLT DBA function distributes the maximum bandwidth B (limit) to be allocated in a cycle $\Delta T$ to a plurality of ONUs according to the amount of the data in the transmission queue in each ONU.

In the case of the G-PON, each time slot is specified with a transmission starting time and a transmission ending time. The OLT sets the bandwidth control information of each ONU indicating both ONU identification information and a time slot in the header part of a GTC downstream frame, then notifies the information items to each ONU. Because the length varies among the branch line optical fiber sections in the PON, the transmission delay time of frames streaming from ONU to OLT also varies among ONUs. Consequently, the OLT measures the transmission delay time of each ONU and notifies an equivalent delay time to each ONU beforehand. Each ONU has a function for correcting the specified transmission starting time with the equivalent delay time upon receiving an allocated time slot from the OLT to start data transmission at a proper timing.

The OLT transfers upstream frames received from the ONU to the GW. In this case, if the OLT transmission buffer is insufficient in capacity, the frames might be discarded. To avoid such frame discarding, for example, JP-A No. 159203/2004 discloses a packet transfer device for limiting the transmission data amount from every ONU housed in the subject OLT by adjusting the access rights in a PON section in case where the accumulated data amount in the OLT built-in buffer exceeds a predetermined threshold value. In the description below, congestion is defined as a state in which frames may be discarded if an amount of accumulated data that exceeds a predetermined threshold value is left as is.

In the field of communication networks, a back pressure (BP) technique is known well as a technique for preventing such discarding of communication frames. According to the technique, congestion occurrence is notified from a congestion-occurred node device to a data transmission source device so that the data transmission source device stops data transmission or adjusts the transmission data amount. For example, JP-A No. 153505/2004 discloses a data frame transmission system that controls congestion with use of a pose frame conforming to the IEEE (Institute of Electrical and Electronic Engineers) 802.3. In JP-A No. 153505/2004, if congestion occurs, the subject data frame transmission device transmits a pose frame to the data transmission source device. Receiving the pose frame, the source device stops the data frame transmission or limits the bandwidth during a period specified with the payload part of the pose frame.

SUMMARY OF THE INVENTION

In the case of a carrier network, a logic path set with such a communication protocol as virtual local area network (VLAN) and multi-protocol label switching (MPLS) is used for Internet connection services. Using such a logic path enables user frames received from a specific subscriber terminal to be transferred along a predetermined route. If such a logic path is set, however, congestion might occur in a gateway (GW) in which logic paths handling much data respectively are concentrated as shown in FIG. 19 and some frames to be transferred might be discarded in the worst case.

In a gateway (GW) that houses plural PONs, even if a specific output port goes into congestion, such frame discarding in the congestion port can be avoided by applying a back pressure to each PON OLT. In other words, when such congestion occurs, a back pressure is applied to the OLT provided with a function for adjusting access rights in a PON section as disclosed in JP-A No. 159203/2004, thereby the amount of data flowing from OLT to GW is reduced. Furthermore, according to the technique disclosed in JP-A No. 153505/2004, the OLT can adjust access rights in the PON section during a period specified in a pose frame.

However, because the GW that houses the OLT is provided with plural input/output ports (line interfaces), even when transmission data is concentrated at a specific output port, the buffer of each of other output ports is usually still sufficient in capacity. In the description below, a "congestion port" is defined as a port in which the output buffer is insufficient in capacity due to transfer data concentration as shown in FIG. 19 and a "normal port" is defined as a port in which the output buffer is still sufficient in capacity even in such a congestion case. And a logic path that passes such a congestion port is referred to as a "congestion port path" and a logic path that passes a normal port is referred to as a "normal port path".

If a congestion control method disclosed in JP-A No. 159203/2004 is applied in a case where a congestion port and a normal port coexist such way, the amount of data transmitted from every ONU to which one of the OLTs connected to a GW is connected is suppressed. Consequently, even when the congestion in the GW is eliminated due to the suppression of the data transmission from each OLT such way, even the bandwidth of the subscriber (ONU) who uses a normal port path comes to be limited while the congestion is limited, thereby the throughput of the whole access network is lowered. That has been a problem.

Furthermore, according to the congestion controlling method disclosed in JP-A No. 159203/2004, each ONU allocated bandwidth is reduced while the congestion is controlled without discriminating between the congestion port path user and the normal port user. Thus if an ONU transmission buffer overflows due to the limitation of the output bandwidth, the normal port path user also comes to suffer from the frame discarding problem.

Under such circumstances, it is an object of the present invention to provide a PON system and a bandwidth controlling method capable of controlling congestion by making good use of the upstream bandwidths of a PON section when congestion occurs at a gateway (GW) connected to an OLT.

It is another object of the present invention to provide a PON system and a bandwidth controlling method capable of controlling congestion without degrading the bandwidth allocated to each ONU that uses a GW normal port when congestion occurs at a gateway (GW) connected to an OLT.

In order to achieve the above objects, a PON system of the present invention is connected to plural optical network units (ONU) through a passive optical network (PON) and an optical line terminal (OLT) connected to a gateway (GW) through a communication line, when receiving a congestion occurrence notice indicating a number of the output port in which congestion occurred (congestion occurred output port number) from the GW, identifies the ID of the ONU that uses a GW output line having the congestion output port number and shifts the PON section bandwidth controlling in a normal mode for allocating a bandwidth to each ONU to that in a bandwidth suppressing mode for allocating a congestion time allowable bandwidth that is less than the current bandwidth to an ONU having the identified ONU identifier and allocating a bandwidth to each of other ONUs according to its transmission queue length.

More concretely, in the PON system of the present invention, the OLT includes a congestion control table that records a relationship between a GW output port number and the identifier of each ONU that uses a GW output line identified with the output port number; an OLT controlling part that records a transmission queue length notified in an upstream PON frame from each ONU beforehand and allocates a bandwidth distributed to each of the ONUs dynamically as the next upstream frame transmission bandwidth in a PON section according to its transmission queue length; and a downstream frame generation part that generates a downstream PON frame including bandwidth control information for indicating an upstream frame transmission bandwidth of each ONU according to the frame transmission bandwidth allocated by the OLT controlling part. When receiving a congestion occurrence notice that indicates a congestion occurred output port number from the GW, the OLT control part identifies the ONU ID corresponding to the congestion occurred output port number in the bandwidth control table and shifts the PON section bandwidth control in a normal mode for allocating a bandwidth to that in a bandwidth suppressing mode for allocating a congestion time allowable bandwidth that is less than the current bandwidth to an ONU having the identified ONU ID and allocating a bandwidth to each of other ONUs according to its transmission queue length.

In the first embodiment of the present invention, the OLT control part includes a bandwidth control table for recording a transmission queue length notified from an ONU, an allocated bandwidth calculated in a predetermined cycle according to the transmission queue length, and a congestion flag corresponding to the ONU ID respectively. When receiving a congestion occurrence notice from the GW, the OLT control part changes the state of the congestion flag corresponding to the ONU ID identified in the bandwidth control table to a congestion display state, then allocates a bandwidth to each ONU of which congestion flag indicates the normal state according to its transmission queue length and allocates a congestion time allowable bandwidth to each ONU of which congestion flag indicates the congestion display state during the bandwidth controlling in the bandwidth suppression mode.

Furthermore, in the first embodiment of the present invention, the downstream frame generation part generates bandwidth control information of each ONU according to its congestion flag state set in the bandwidth control table and, in the downstream PON frame, notifies each ONU of which congestion flag indicates the normal state in the downstream PON frame of a bandwidth according to its transmission queue length and notifies each ONU of which congestion flag indicates the congestion display state of a congestion time allowable bandwidth.

The OLT control part, when receiving a congestion reset notice indicating a number of the output port in which congestion is reset (congestion reset output port number) from the GW, identifies the ONU ID corresponding to the congestion reset output port number with reference to the bandwidth control table beforehand and changes the state of the congestion flag corresponding to the ONU ID identified in the bandwidth control table to the normal state at a predetermined timing.

According to the present invention, when congestion occurs at a specific output port of a GW to which an OLT is connected as shown in FIG. 20, the OLT can delete the bandwidth of the specific ONU that is transmitting communication frames to the congestion occurred output port selectively, thereby the OLT can distribute a surplus bandwidth in the PON section generated due to the deletion to other ONUs. Thus the GW congestion state can be eliminated without lowering the whole system throughput.

BRIEF DESCRIPTION OF THE DRAWINGS

FIG. 5 is an example of a bandwidth control table provided for an OLT;

FIG. 6 is an example of a congestion control table provided for an OLT;

DETAILED DESCRIPTION OF THE PREFERRED EMBODIMENTS

Hereunder, the preferred embodiments of the present invention will be described with reference to the accompanying drawings.

First Embodiment

Figure 1:
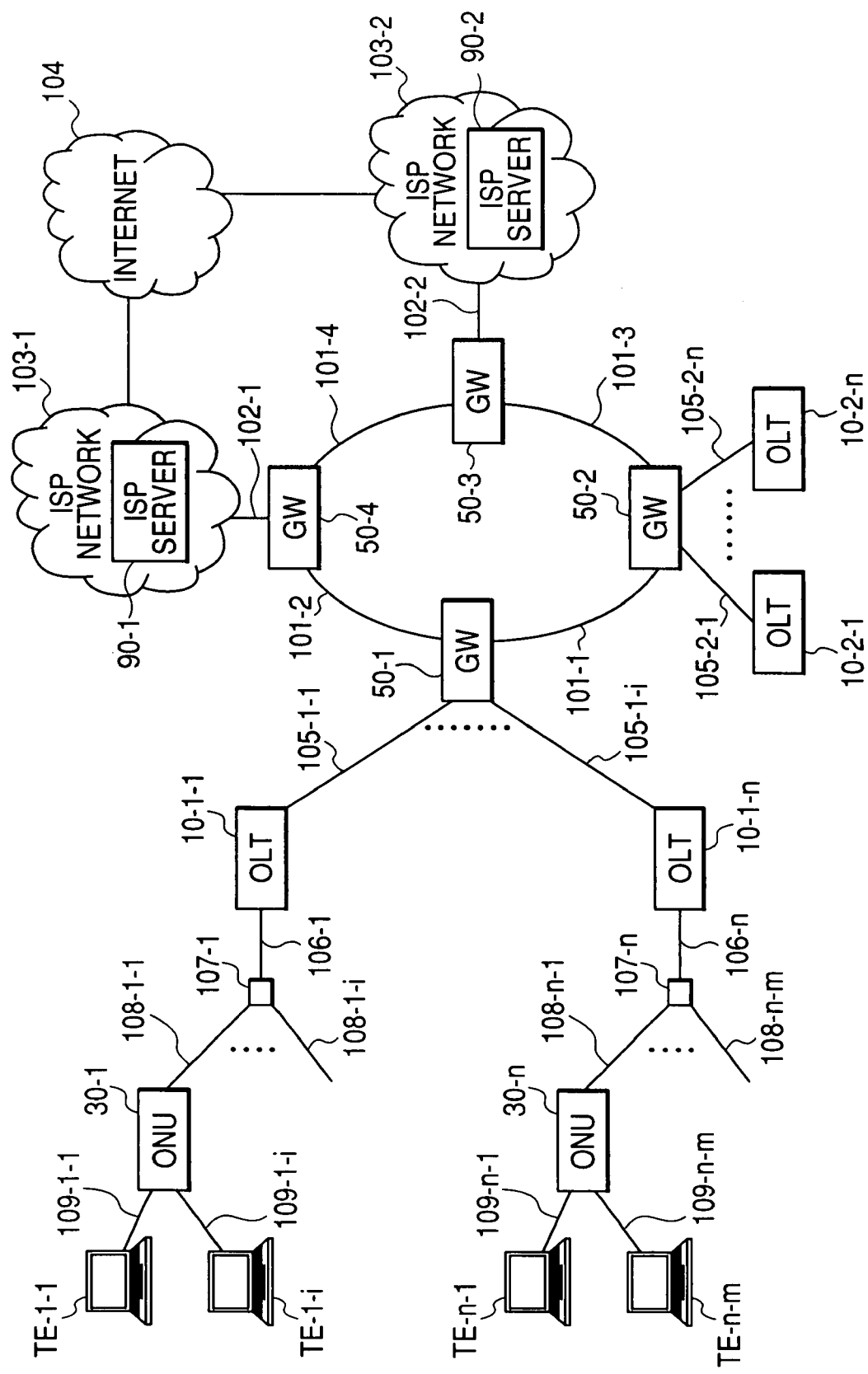
FIG. 1 is a diagram for showing a configuration of a network to which the present invention applies.

FIG. 1 is a diagram for showing an example of a communication network to which the present invention applies.

A carrier network consists of an access network and a metro network. The access network includes optical line terminals (OLT) 10 (10-1-1 to 10-2-n) and plural optical network units (ONU) 30 (30-1 to 30-n) connected to each other through a passive optical network (PON) respectively. The metro network includes plural gateways (GW) 50 (50-1 to 50-4) connected to each other through lines 101 (101-1 to 101-4).

Each of subscriber terminals TE (TE-1-1 to TE-n-m) is connected to the ONU 30 through one of the lines 109 (109-1 to 109-n-m) and connected to the metro network through a PON and an OLT 10. The gateways GW 50 of the metro network are divided into two types; GWs like 50-1 and 50-2 connected to an OLT 10 through the lines 105 (105-1-1 to 105-2-n) and GWs like 50-3 and 50-4 connected to ISP networks 103 (103-1 and 103-2) through the lines 102 (102-1 and 102-2). Each IPS network 103 is provided with ISP servers 90 (90-1 and 90-2) and each subscriber terminal TE accesses the Internet 114 through an ISP server 90. On each of connection lines 101, 102, 105, and 109 are transferred communication frames according to the Ethernet (trade mark) protocol.

The passive optical network PON consists of optical fibers 106 (106-1 to 106-n) housed in an OLT 10, branch line optical fibers 108 (108-1-1 to 108-n-m) connected to each ONU 30, and optical splitters 107 (107-1 to 107-n). The PON is structured, for example, as a G-PON conforming to the ITU-T Recommendation G.984.1.

A downstream optical signal transmitted from an OLT 10 through an optical fiber 106 is branched by an optical splitter 107 into plural branch line optical fibers 108 and broadcast to plural ONUs 30 connected to those branch optical fibers 108. On the contrary, upstream optical signals transmitted from each ONU 30 through branch line optical fibers 108 are multiplexed by an optical splitter 107 and transferred to an OLT 10 through an optical fiber 106. In this embodiment, it is assumed that both upstream and downstream optical signals are subjected to a frequency multiplexing process and transmitted through the same optical fiber. However, it is also possible to divide the optical fibers 106 and 108 in a PON section into an upstream one and a downstream one, thereby the same wavelength optical signal is applied to the upstream and downstream optical signals. Although the metro network connects plural gateways GW 50 to each other in a ring pattern with the line 101 in FIG. 1, the metro network may also connects those gateways GW 50 in another pattern, for example, in a mesh pattern.

The present invention premises that a fixed data path is provided for each ONU 30 in the metro network. For example, assume now that a user connected to the ONU 30-1 has made a contract with a provider of the ISP network 103-1 for a connection service to the Internet. In this case, the GW 50-1 always transfers communication frames received from the ONU 30-1 through the OLT 10-1-1 to the connection line 101-2 of the ISP network 103-1. At first, the ISP server 90-1 of the ISP network 103-1 executes predetermined communication procedures such as user authentication, IP address allocation, etc. with respect to each subscriber terminal TE, then enables the communication between the subscriber terminal TE and the Internet 104.

In the same way, if the user connected to the ONU 30-n has made a contract with a provider of the ISP network 103-1 for a connection service to the Internet, the GW 50-1 always comes to transfer frames received from the ONU 30-n through the OLT 10-1-n to the connection line 101-2.

According to the present invention, each OLT 10 already knows a GW output port through which frames from each ONU 30 connected through the PON are transmitted. If congestion occurs in a GW transmission queue, therefore, the OLT 10 controls the bandwidth in the PON section by making good use of the relationship between the ONU 30 and the GW.

Figure 2:
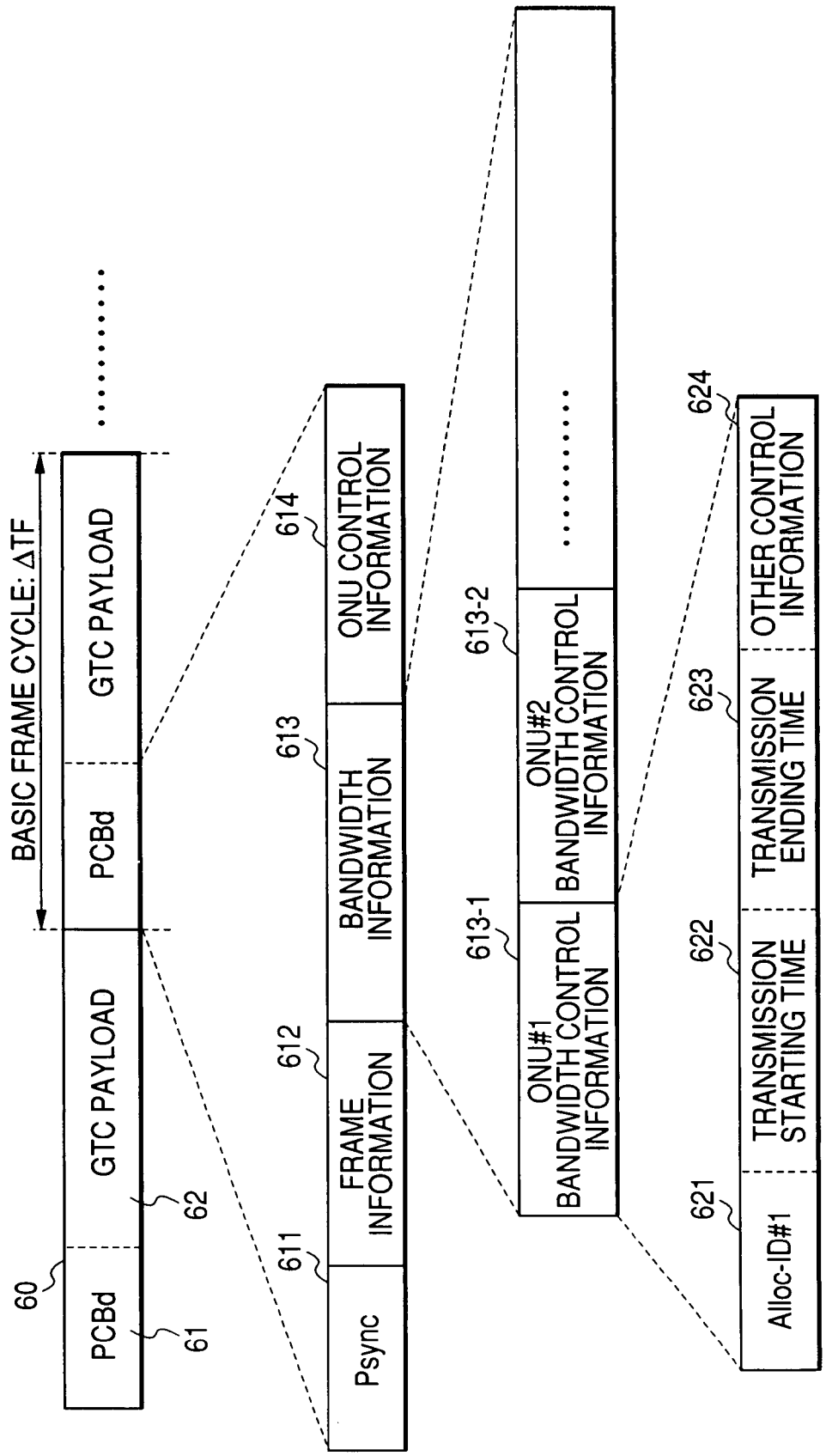
FIG. 2 is an example of a downstream frame format in a PON section.

FIG. 2 is an example of a format of downstream frames in a PON section, transmitted from the OLT 10 to the ONU 30. Here, a GTC downstream frame applied to the G-PON is shown.

A GTC downstream frame 60 consists of a header part (PCBd) 61 and a GTC payload 62. The GTC payload 62 includes plural unicasting frames addressed to a specific ONU and broadcasting frames or multicasting frames to be received by plural ONUs in the GEM frame format specific to a PON section. Each ONU checks the ONU ID set in the header of the GEM frame extracted from the GTC payload 62 to select each frame it receives.

The OLT 10 transmits each GTC downstream frame 60 in the basic frame cycle ΔTF, for example, in cycles of 125 microseconds. The header part 61 of the GTC downstream frame consists of a Psync field 611 that includes a specific signal pattern to enable the receiving side (ONU 30) to synchronize with frames, a bandwidth information field 613 for notifying each ONU 103 of an upstream frame transmission time band, an ONU control information field 614 for notifying each ONU of such control information as starting, stopping, etc., and a field of other field information 612. The frame information field 612 includes, for example, such information as whether to make an FEC processing in the subject frame, a frame counter, a BIP, a header length, etc. The contents in the frame information field 612 and the ONU control information field 614 are deleted in some cases according to the circumstances.

The bandwidth information field 613 consists of plural bandwidth control information fields 613-1, 613-2 . . . provided for each ONU. Each bandwidth control information field 613-i indicates a bandwidth control ID (Alloc-ID) 621 for identifying an ONU, a transmission starting time 622 and transmission ending time 623 for indicating an upstream frame transmission time band (allocated bandwidth), and other control information 624. The other control information 624 includes, for example, information about whether to notify the subject transmission queue state from ONU to OLT and control information for specifying whether to require an FEC in the subject upstream frame.

The destination ONU (Alloc-ID) 621 of the bandwidth information notified in the bandwidth information field 613 has no relation to the destination ONU in the GEM frame included in the payload 62. The OLT 10 calculates a bandwidth to be allocated to each ONU 30 under its control in cycles of 125 microseconds×N (e.g., N=4 to 6). The OLT 10 divides the upstream transmission time band of 125 microseconds×N into plural time bands so as to allocate a longer transmission time band to each ONU having a lot of data in the transmission queue according to the state of the upstream transmission queue in each ONU (e.g., a queue length indicating an amount of data to be transmitted) to determine a bandwidth to be allocated to each ONU.

For example, if m units of ONUs 30 are connected to an OLT 10, each GTC downstream frame includes bandwidth control information related to some of the m units of ONUs. The OLT 10 completes notice of an allocated bandwidth to each ONU by transmitting GTC downstream frames by N times consecutively. Each ONU finds bandwidth control information having the Alloc-ID of itself in a received GTC downstream frame to transmit upstream data according to the transmission starting time 622 and the transmission ending time 623 indicated by the bandwidth control information.

According to the present invention, the GW 50 monitors the transmission queue length QL at each output port and when the transmission queue length QL exceeds a predetermined first threshold HT1, the GW 50 transmits a congestion occurrence notification frame that specifies an output port number to the OLT 10 to prevent communication frame discarding to be caused by insufficient capacity of the buffer. Each OLT 10 allocates a bandwidth to each OLT in the bandwidth suppression mode for suppressing only the amount of transmission data from a specific ONU to be transmitted to the output port specified in the above congestion occurrence notification frame (hereunder, to be referred to as a congestion port).

When the congestion port transmission queue length falls below the second threshold TH2 that is lower than the first threshold TH1 due to a back pressure to the OLT, the GW 50 transmits a congestion reset notification frame that specifies the subject output port number to each OLT 10. Each OLT 10 then resets the suppression of the amount of transmission data to be transmitted to the output port specified in the congestion reset notification frame and returns to the bandwidth allocation control in the normal mode according to the state of the upstream transmission queue in each ONU.

In the case of the network configuration shown in FIG. 1, for example, if the length of the transmission queue of an output port connected to the line 101-2 exceeds the first threshold value TH1, the GW 50-1 transmits a congestion occurrence notification frame to each of the OLTs 10-1-1 to 10-1-n, thereby each of the OLTs 10-1-1 to 10-1-n reduces the bandwidth allocated to the ONU that is communicating with the Internet 104 through an ISP network 103.

As to be described later, in the first embodiment of the present invention, each OLT is provided with a congestion control table for recording a relationship between each output port number and each ONU ID of the connected GW 50. Thus the OLT, when receiving a congestion occurrence notification frame from the GW 50, identifies the ONU ID corresponding to the congestion port number with reference to the congestion control table and allocates a bandwidth to each OLT in the bandwidth suppression mode so as to reduce the allocated bandwidth to the ONU having this ONU ID.

Also in the first embodiment of the present invention, each OLT is provided with a bandwidth control table for indicating the relationship among a transmission queue length, the current allocated bandwidth, and a predetermined congestion time allowable bandwidth with respect to an ONU ID respectively. When an ONU ID corresponding to a congestion port number is identified, therefore, each OLT reduces the bandwidth allocated to the ONU having this ONU ID up to a congestion time allowable bandwidth specified in the bandwidth control table. In the bandwidth suppression mode, because the bandwidth in the PON section comes to have a surplus due to the reduction of the amount of data transmitted to the congestion port from the ONU, the OLT 10 uses the PON section bandwidth effectively by increasing the bandwidth allocated to another ONU that is transmitting data to a normal port.

Figure 3:
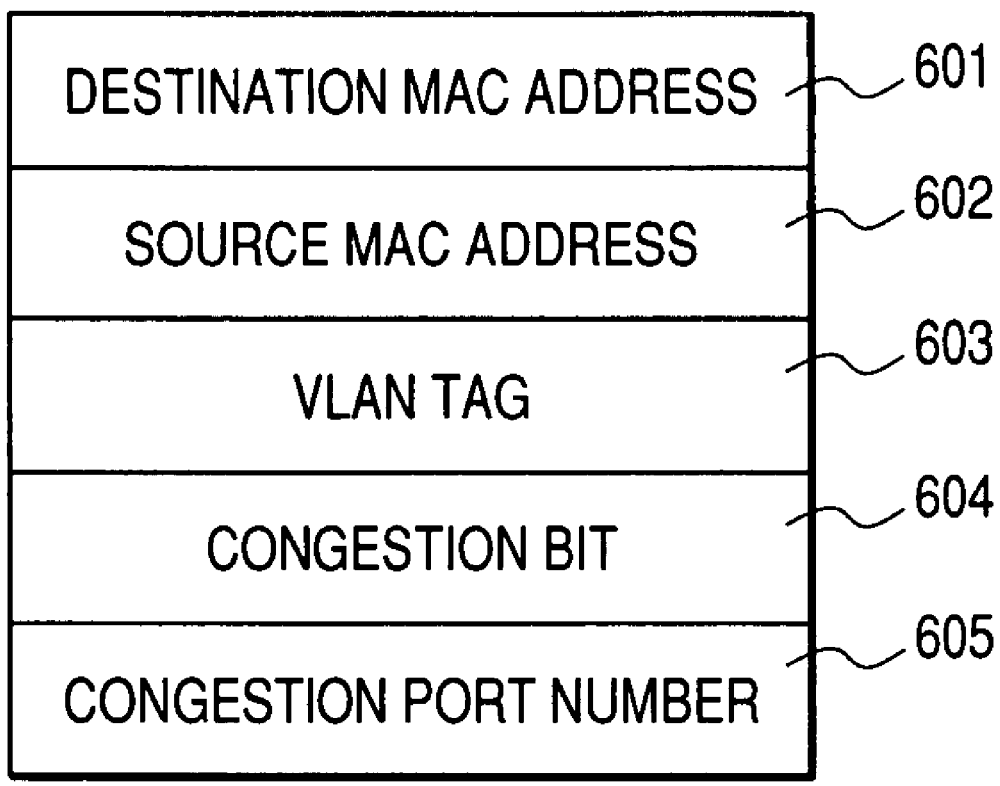
FIG. 3 is an example of a format of a congestion occurrence/reset notification frame to be transmitted from a GW.

FIG. 3 is an example of a format of the congestion occurrence/reset notification frame (back pressure control frame) transmitted from GW 50 to OLT 10.

The back pressure control frame uses, for example, a frame format provided with an Ethernet VLAN (Virtual Local Area Network) tag. The back pressure control frame includes a destination MAC (Media Access Control) address 601, a source MAC address 602, a VLAN tag 603, a congestion bit 604, and a congestion port number 605.

The destination MAC address 601 indicates the MAC address of each OLT 10 housed in a GW 50 and the source MAC address 602 indicates the MAC address of a network interface that houses a connection line between the GW 50 and OLT 10. The VLAN tag 603 has a specific value set to indicate that the subject frame is a back pressure control frame. The congestion bit 604 has the value "1" for a congestion occurrence notification frame and "0" for a congestion reset notification frame. The congestion port number 605 indicates a congestion detected GW output port number.

Receiving a back pressure control frame, each OLT 10 can recognize the received frame as a back pressure control frame according to the value set in the VLAN tag 603 and determine the received frame as a congestion occurrence notification or congestion reset notice according to the value set in the congestion bit 604. Each OLT 10 can also identify an ONU of which allocated bandwidth is to be reduced with reference to the congestion port number 605, the congestion control table, and the bandwidth control table.

Figure 4:
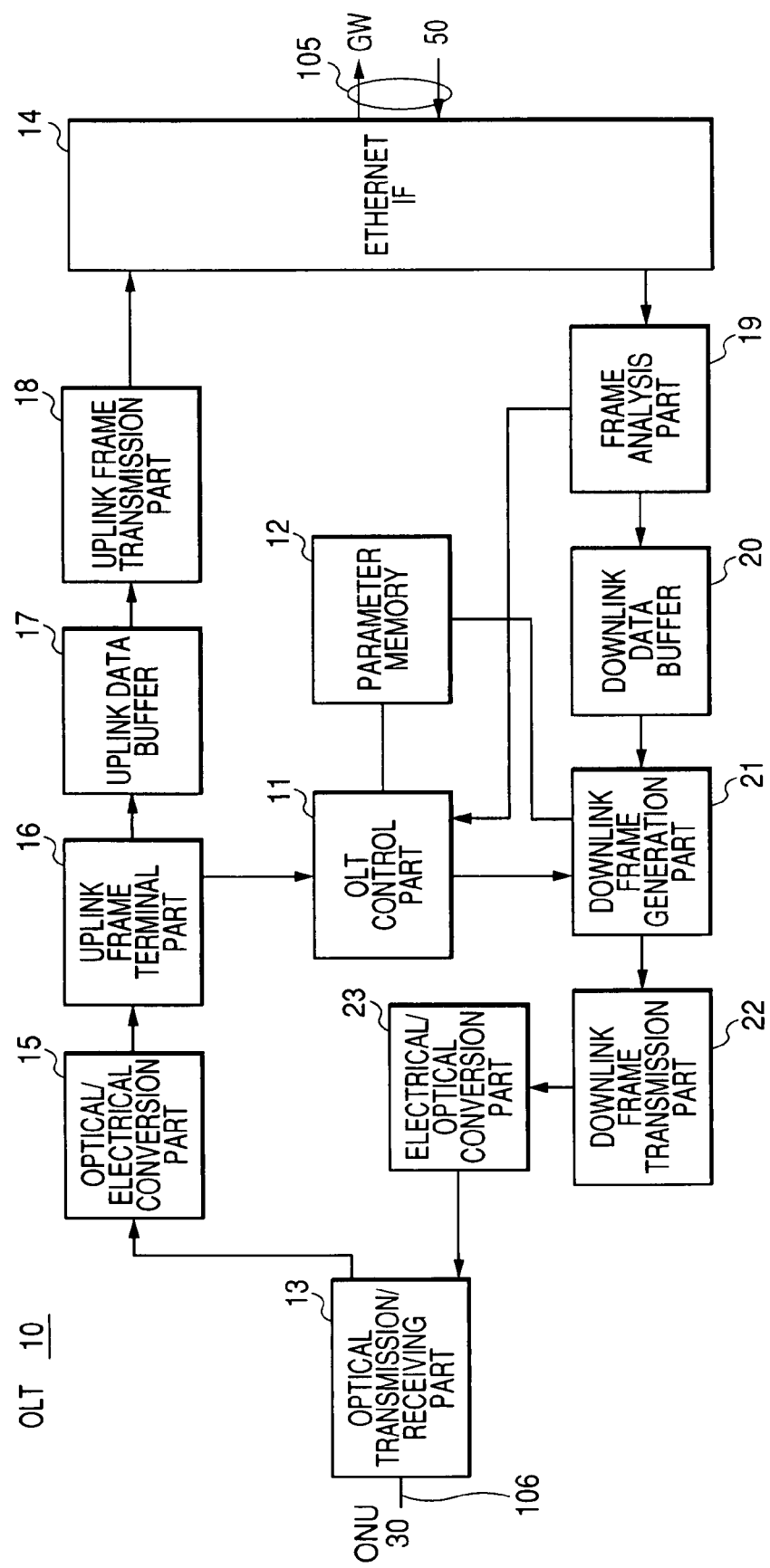
FIG. 4 is a block diagram of a configuration of an OLT.

FIG. 4 is a block diagram of a configuration of an OLT 10.

The OLT 10 consists of an OLT control part 11, a parameter memory 12, an optical transmission/receiving part 13 connected to a PON optical fiber 106, an Ethernet interface (IF) 14 connected to an Ethernet line 105 for connecting a GW 50, as well as an upstream signal processing circuit and a downstream signal processing circuit connected respectively between the optical transmission/receiving part 13 and the Ethernet interface IF 14. The parameter memory 12 includes a bandwidth control table 120 to be described in FIGS. 5 and 6 and a congestion control table 130 formed respectively in itself.

The upstream signal processing circuit consists of an optical/electrical conversion part 15 for converting each optical signal received by the optical transmission/receiving part 13 to an electrical signal, an upstream frame terminal part 16 connected to the optical/electrical conversion part 15, an upstream data buffer 17 for temporarily storing upstream frames output from the upstream frame terminal part 15, and an upstream frame transmission part 18 for reading frames from the upstream data buffer 17 and transmitting those frames to the Ethernet IF 14. The upstream frame terminal part 16 regenerates an upstream frame from each output signal of the optical/electrical conversion part 15 and outputs such control information as a source queue length extracted from the frame header to the OLT control part 11, as well as converts each received frame to a data frame in the Ethernet format and outputs the data frame to the upstream data buffer 304.

The downstream signal processing circuit consists of a frame analysis part 19 connected to the Ethernet IF 14, a downstream data buffer 20 for temporarily storing user frames output from the data analysis part 19, a frame generation part 21 for generating a downstream PON frame (GTC downstream frame) described in FIG. 2 in a predetermined cycle ΔTF and mapping each user frame read from the downstream data buffer 20 or control frame output from the OLT control part 11 in the GEM frame format, a downstream frame transmission part 22 for transmitting each downstream frame output from the downstream frame generation part 21 as an electrical signal, and an electrical/optical conversion part 23 for converting each electrical signal output from the downstream frame transmission part 22 to an optical signal. The frame analysis part 19 analyzes frames received from the Ethernet IF 14 and outputs user frames to the downstream data buffer 20 and back pressure control frames to the OLT control part 11 respectively.

The OLT control part 11 calculates a bandwidth to be allocated to each ONU 30 in a predetermined cycle according to the source queue length indicated by the bandwidth control table 120 formed in the parameter memory 12 and updates the bandwidth control table 120 with the result. How the OLT control part 11 calculates a bandwidth to be allocated such way will be described more in detail later with reference to FIG. 9.

As shown in FIG. 5, the bandwidth control table 120 consists of plural table entries, each corresponding to a bandwidth control ID (Alloc-ID) 121 that is an ONU ID. Each table entry indicates a congestion time allowable bandwidth (Bcon) 122 predetermined for each ONU, a maximum control bandwidth (Bmax) 123, an allocation bandwidth (BW) 124 calculated by the OLT control part 11, an ONU source queue length (SQ) 125, a congestion flag 126, and a carry-over bandwidth 127. The source queue length (SQ) 125 indicates the latest value of the transmission queue of the ONU 30 notified from the upstream frame terminal part 303.

As shown in FIG. 6, the congestion control table 130 consists of a congestion flag 132 corresponding to a GW output port number 131 and plural table entries, each indicating a relationship with an ONU ID (bandwidth control ID) 133 that uses a GW output line identified with the GW output port number 131.

The OLT control part 11, when receiving a back pressure control frame as shown in FIG. 3 from the frame analysis part 19, refers to the congestion control table 130 formed in the parameter memory 12 to update the congestion flag 132 of a table entry corresponding to the congestion port number 605 indicated in the back pressure control frame according to the congestion bit 605 in the received frame, then identifies the ID 133 of the ONU in which the congestion is to be controlled. After that, the OLT control part 11 searches for a table entry corresponding to the bandwidth control ID 133 in the bandwidth control table 120 and updates the value of the congestion flag 126. If the back pressure control frame is a congestion occurrence notification frame (congestion flag="1"), the value of the congestion flag 126 is changed to "1" immediately. If the back pressure control frame is a congestion reset notification frame (congestion flag="0"), the value of the congestion flag 126 is changed to "0" at the next bandwidth calculation time.

Figure 7:
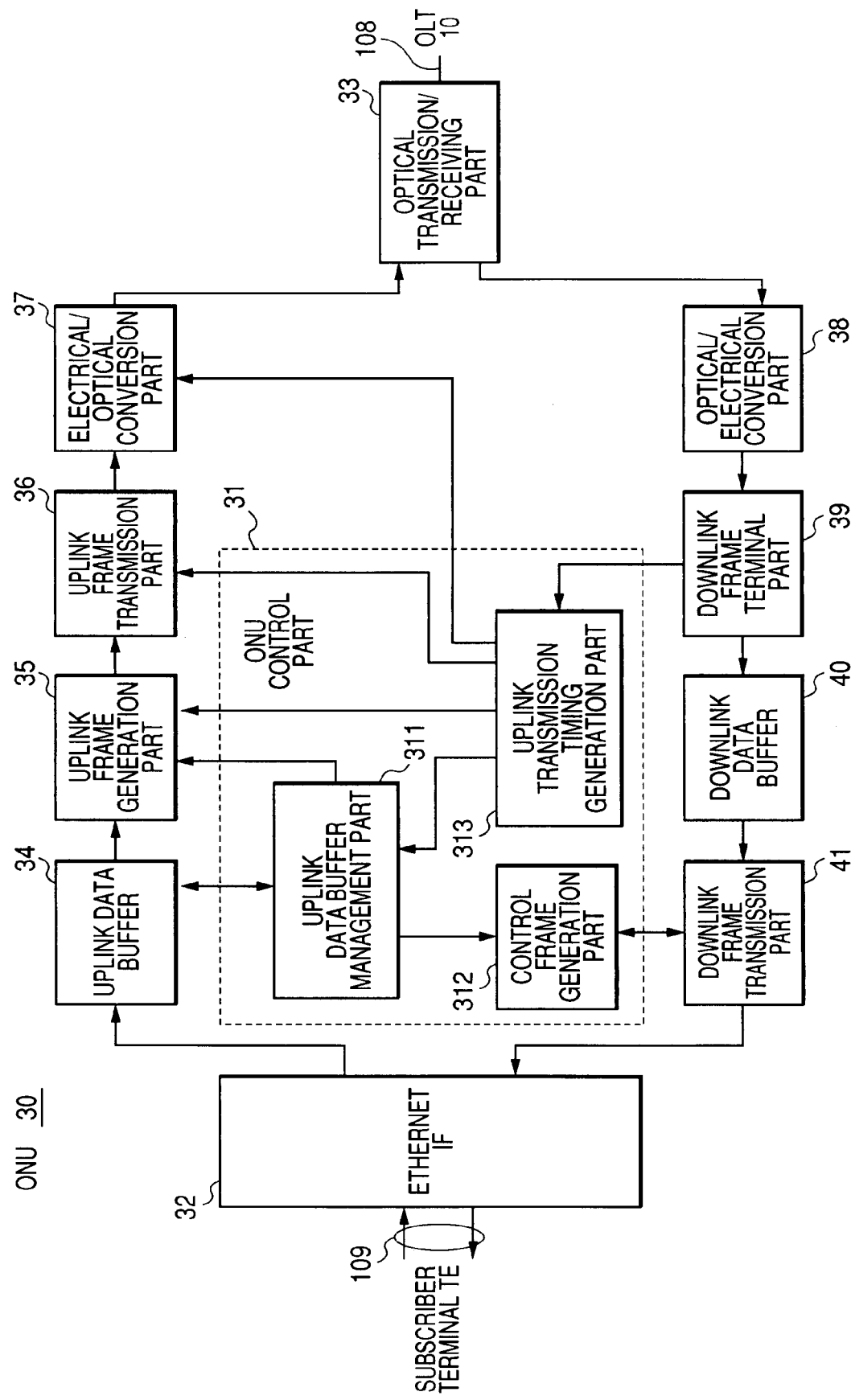
FIG. 7 is a block diagram of a configuration of an ONU.

FIG. 7 is a block diagram of a configuration of an ONU 30.

The ONU 30 consists of an ONU control part 31, an Ethernet interface (IF) 32 connected to an Ethernet line 109 for connecting a subscriber terminal TE, an optical transmission/receiving part 33 connected to a PON branch line optical fiber 108, as well as an upstream signal processing circuit and a downstream signal processing circuit connected respectively between the Ethernet interface IF 32 and the optical transmission/receiving part 33.

The ONU control part 31 consists of an upstream data buffer management part 311, a control frame generation part 312, and an upstream transmission timing generation part 313.

The upstream signal processing circuit consists of an upstream data buffer 34 for temporarily storing upstream user frames output through the Ethernet IF, an upstream frame generation part 35 for generating upstream PON frames, an upstream frame transmission part 36 for transmitting upstream PON frames generated by the upstream frame generation part 35 in a time band indicated by the upstream transmission timing generation part 313, and an electrical/ optical conversion part 37 for converting each electrical signal output from the upstream frame transmission part 36 to an optical signal.

The downstream signal processing circuit consists of an optical/electrical conversion part 38 for converting each optical signal received by the optical transmission/receiving part 33 through a branch line optical fiber 108 to an electrical signal, a downstream frame terminal part 39 connected to the optical/electrical conversion part 38, a downstream data buffer 40 for temporarily storing user frames addressed to the ONU of itself from the downstream frame terminal part 39, and a downstream frame transmission part 41 for transmitting user frames read from the downstream data buffer 40 and control frames supplied from the control frame generation part 312 to the Ethernet IF 32 respectively.

The downstream frame terminal part 39 converts each signal output from the optical/electrical conversion part 38 to a downstream PON frame (GTC downstream frame) and supplies information of an allocated bandwidth to the self-ONU, extracted from the frame header (PCBd), to the upstream signal timing generation part 313. The downstream frame terminal part 39 also extracts each user frame addressed to the self ONU from the GTC payload and converts the user frame to a data frame in the Ethernet format and outputs the frame to the downstream data buffer 40.

The upstream transmission timing generation part 313 determines an upstream frame transmission time band according to the transmission starting time and the transmission ending time indicated by the allocated bandwidth information, as well as according to an equivalent delay time notified beforehand from the OLT 10, then controls the upstream frame generation part 35, the upstream frame transmission part 36, and the upstream buffer management part 311 respectively.

The upstream data buffer management part 311 monitors the amount of data (transmission queue length) stored in the upstream data buffer 34. When the transmission queue length exceeds a predetermined threshold value, the management part 311 issues a control signal to the control frame generation part 312, which then generates a pose frame and notifies the upstream frame generation part 35 of the current transmission queue length at a timing specified by the upstream transmission timing generation part 313. The upstream frame generation part 35 includes information of a transmission queue length notified from the upstream buffer management part 311 in the header according to a command from the upstream transmission timing generation part 313 and generates an upstream PON frame including a user frame read from the upstream data buffer 34 in the payload, then outputs the PON frame to the upstream frame transmission part 36.

The control frame generation part 312 generates a control frame (pose frame) used to instruct an object subscriber terminal TE to suppress data transmission according to a control signal received from the upstream data buffer management part 311, then outputs the control frame to the downstream frame transmission part 41. The downstream frame transmission part 41 transmits each user frame read from the downstream data buffer 40 to the Ethernet IF 32 if there is no pose frame generated from the control frame generation part 312. If a pose frame is generated, the control frame generation part 312 transmits the pose frame to the Ethernet IF 32.

After suppressing data transmission in response to the pose frame, if the subscriber terminal TE has a queue length of the upstream data buffer 34, which falls below the predetermined congestion reset threshold value, the upstream data buffer management part 311 issues a control signal for resetting congestion to the control frame generation part 312. In response to the control signal, the control frame generation part 312 generates a control frame to reset the suppression of the data transmission and outputs the control frame to the downstream transmission part 41.

Figure 8:
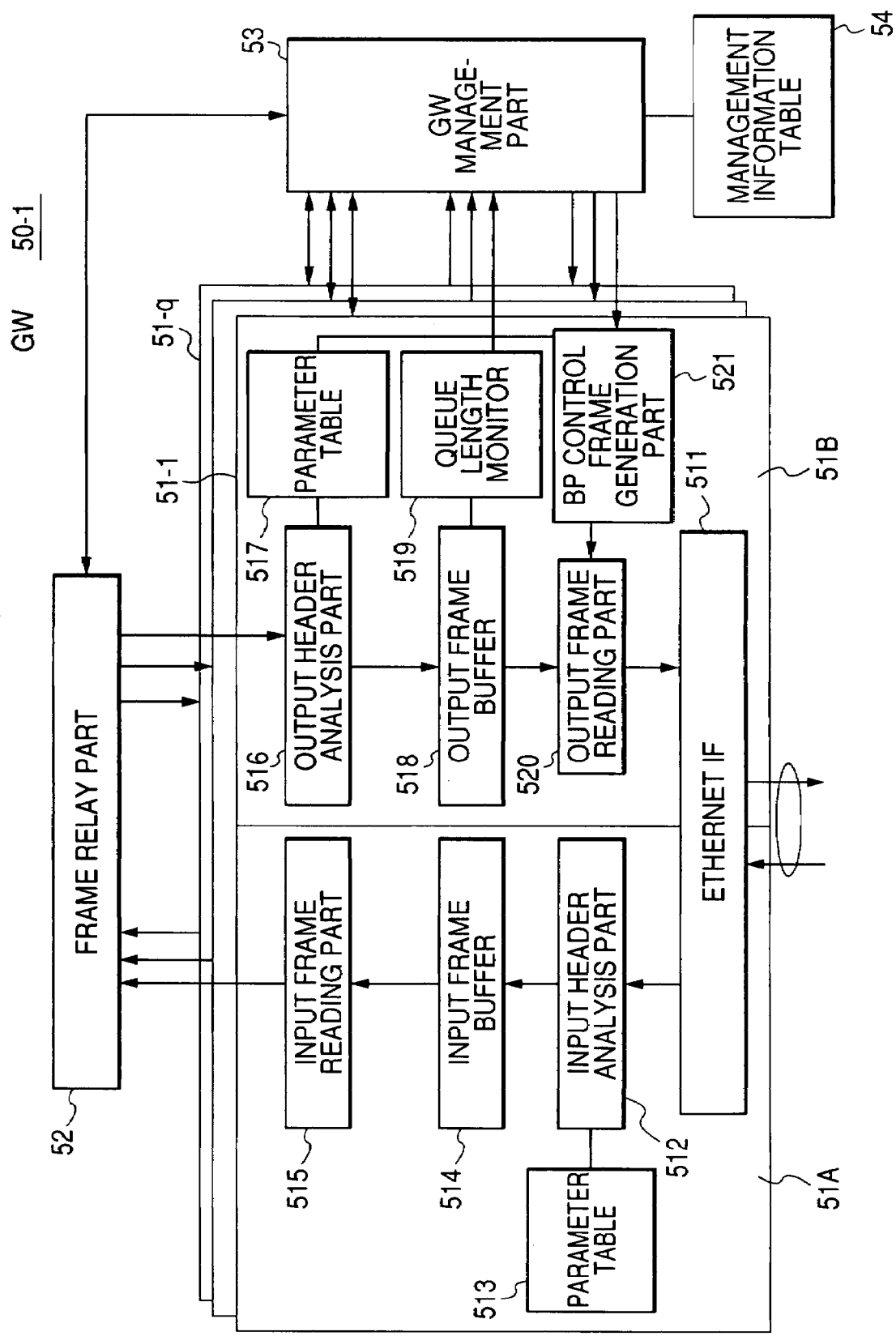
FIG. 8 is a block diagram of a configuration of a GW.

FIG. 8 is a block diagram of a configuration of a GW 50-1.

The GW 50-1 consists of plural network interface (NIF) parts 51 (51-1 to 51-q) connected to an Ethernet line (105 or 101) respectively, a frame relay part 52 for connecting those NIF parts 51 to each other, a GW management part 53, and a management information table 54 for holding GW management information to be referred to from the GW management part 53. Each NIF part 51 consists of an input line interface part 51A connected to the Ethernet IF 511 for housing Ethernet input/output lines and an output line interface part 51B.

The input line interface part 51A consists of a parameter table 513 for holding parameter information used for header processing, an input header analysis part 512 for analyzing the header of each frame received from the Ethernet IF 511 and adding an internal header including internal routine information to the received frame according to the parameter table 513, an input frame buffer 514 for temporarily storing frames output from the input header analysis part 512, and an input frame reading part 515 for reading frames from the input frame buffer 514 and outputting the read frames to the frame relay part 52.

The frame relay part 52 relays each frame received from each input line interface part 51A to the output line interface part 51B of a specific output port determined by the internal routine information. As described above, according to the present invention, because a fixed path is set for each ONU in a carrier network, the frame relay part 52 comes to transfer frames through a fixed output port in each ONU 103.

The output line interface part 51B consists of a parameter table 517, an output header analysis part 516 for analyzing each frame received from the frame relay part 52 to remove the internal header and make a header processing according to the data set in the parameter table 517, an output frame buffer 518 for temporarily storing frames output from the output header analysis part 516, a queue length monitor 519 for monitoring the amount of data (queue length) stored in the output frame buffer 519 and outputting queue length information to the GW management part 53, an output frame reading part 520 for reading frames output from the output frame buffer 518 and outputting the frames to the Ethernet IF 511, and a back pressure control frame generation part 521.

The parameter table 517 records parameter information required for a header processing, a destination MAC address (OLT MAC address) required to generate a back pressure control frame, and a source MAC address (Ethernet IF MAC address). However, the output line interface part 51B to which no OLT is connected is not required to record those MAC addresses. The management information table 54 records the first threshold value TH1 for detecting congestion occurrence, the second threshold value TH2 for detecting congestion reset, and a congestion flag indicating a congestion state in each output port (output line interface part 51B). The first and second threshold values are in a relationship of TH1>TH2.

The GW management part 53, when receiving a queue length QL from the queue length monitor 519 of each output line interface part 51B, compares the queue length QL with the threshold values TH1 and TH2. If the queue length QL of the output frame buffer 518 of an output port Pi exceeds the first threshold value TH1, the GW management part 53 sets "1" in the congestion flag corresponding to the output port Pi in the management information table 54 and notifies the congestion occurrence to the back pressure control frame generation part 521 belonging to each of other output ports.

As for the output port Pi of which congestion flag is set at "1", the GW management part 53 compares the queue length QL of the output frame buffer 518 to be received later from the queue length monitor 519 with the second threshold value TH2. When the queue length QL is under the second threshold value TH2, the GW management part 53 changes the value of the congestion flag to "0" and notifies the back pressure control frame generation part 521 belonging to each of other output ports, of congestion reset. The congestion occurrence notice and the congestion reset notice respectively include a VLAN tag value, a congestion bit indicating occurrence/reset of congestion, an output port number indicating a congestion occurred (reset) output line interface part 51B.

The back pressure control frame generation part 521 of each output line interface part 51B, when receiving a congestion occurrence or reset notice from the GW management part 53, reads the object MAC address information from the parameter table 517 to generate a back pressure control frame shown in FIG. 3 and output the frame to the output frame reading part 520. The output frame reading part 520, when receiving the back pressure control frame and completing the transmission of one of the frames being read from the output frame buffer 518, transmits the control frame to the back pressure control frame Ethernet IF 511, then restarts reading/transmission of frames from the output frame buffer 518 later.

Figure 9:
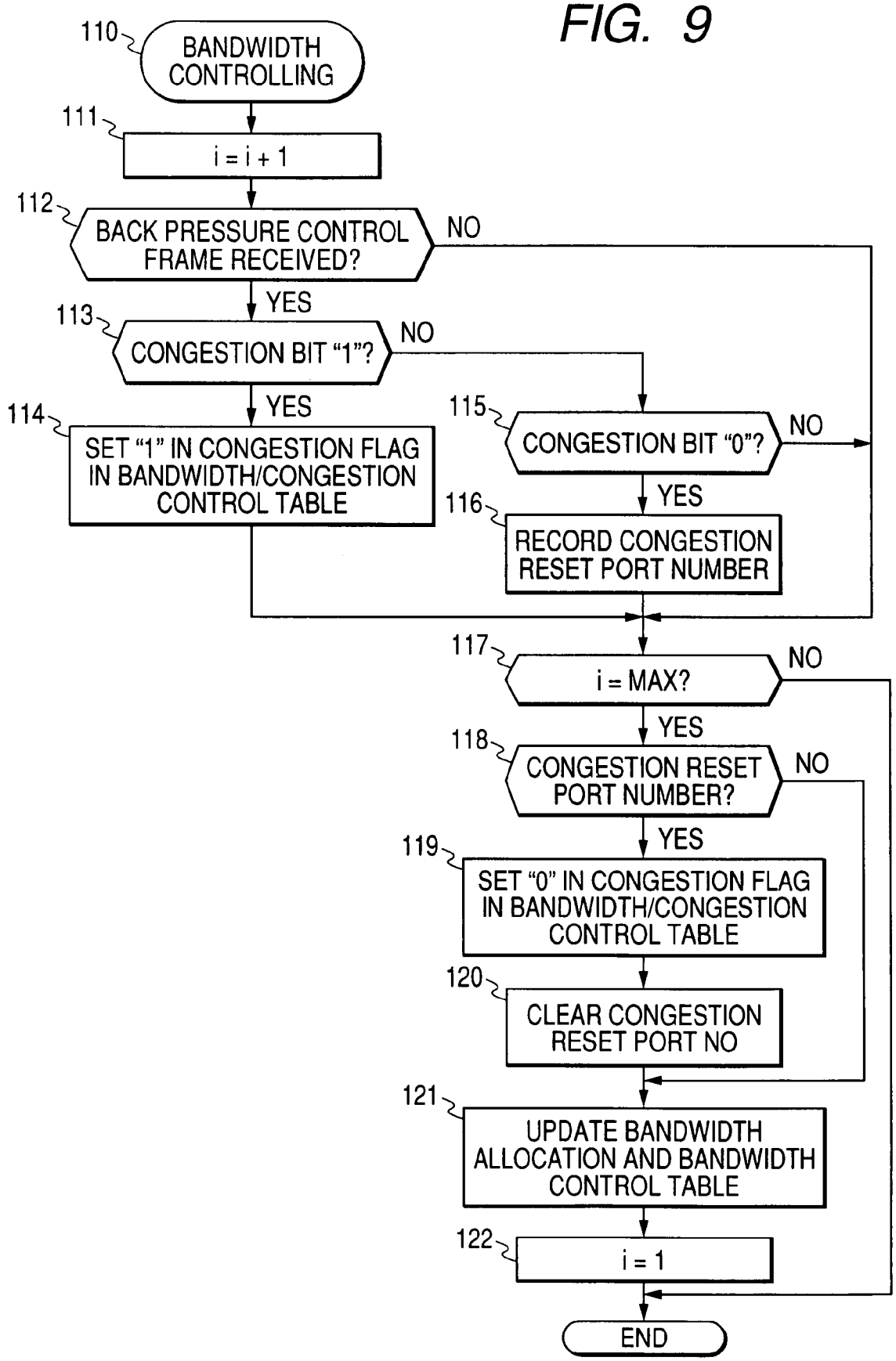
FIG. 9 is a flowchart of an example of bandwidth control processings executed by an OLT.

FIG. 9 is a flowchart of bandwidth control processings executed by the OLT control part 11 of an OLT 10. The OLT control part 11 executes a bandwidth control processing 110 in the basic frame cycle ΔTF (in cycles of 125 microseconds) shown in FIG. 2 to calculate a bandwidth to be allocated to each ONU in the ΔTF×N cycle. In the description below, the N value is represented as MAX and the number of execution times of the bandwidth control processing 110 is represented by a parameter i.

In the bandwidth control processing 110, the OLT control part 11 increases the value of the parameter i (i=i+1) (step 111) and checks whether or not a new back pressure control frame is received from the GW (step 112). If no back pressure control frame is received, the OLT control part 11 determines whether or not the parameter i value has reached MAX (step 117). If the determination result is NO (>MAX), the OLT control part 11 exits the processing. If the determination result is YES (=MAX), the OLT control part 11 calculates a bandwidth to be allocated (to be described later) and updates the bandwidth control table 120.

If a new back pressure control frame is received from the GW, the OLT control part 11 checks the congestion bit 604 included in the received frame (step 113). If "1" is set in the congestion bit 604, that is, if the received frame is a congestion occurrence notification frame, the OLT control part 11 sets "1" in the congestion flags 132 and 126 corresponding to the congestion port number 605 indicated in the received frame in the congestion control table 130 and bandwidth control table 120 (step 114), then determines whether or not the value of the parameter i has reached the MAX (step 117).

Concretely, in step 114, the OLT control part 11 searches the subject table entry corresponding to the congestion port number 605 in the congestion control table 130 and sets "1" in the congestion flag 132, then refers to the bandwidth control table 120 according to the bandwidth control ID 133 indicated by the table entry to set "1" in the congestion flag 126 of each table entry corresponding to the bandwidth control ID 133.

In case where "0" is set in the congestion bit included in the received frame, that is, if the received frame is a congestion reset notification frame, the OLT control part 11 records the value of the congestion port number 605 in the work area as a congestion reset port number (step 116), then determines whether or not the parameter i value has reached the MAX (step 117). If the determination result is NO (<MAX), the OLT control part 11 exits the processing.

If the parameter i value has reached the MAX, the OLT control part 11 checks the congestion reset port number in the work area (step 118). If no congestion reset port number is recorded in the area, the OLT control part 11 calculates a new bandwidth to be allocated to each ONU with reference to the bandwidth control table 120 and records the new allocation bandwidth 124 in the bandwidth control table 120 (step 121). After that, the OLT control part 11 sets the initial value "1" in the parameter i and exits the processing.

If a congestion reset port number is recorded in the work area, the OLT control part 11 sets "0" in the congestion flags 132 and 126 corresponding to the congestion reset port number in the congestion control table 130 and in the bandwidth control table 120 respectively (step 119), then clears the congestion reset port number in the work area (step 120). After that, the OLT control part 11 calculates a new bandwidth to be allocated to each ONU (step 121).

According to the present invention, the bandwidth allocation calculation mode executed by the OLT control part 11 includes a normal mode and a bandwidth suppression mode. In the normal mode, for example, a bandwidth is allocated to each ONU according to a source queue length 125 indicated in the bandwidth control table 120 with use of a dynamic bandwidth allocation (DBA) function ruled by the ITU-T Recommendations G983.4 and G984.3. Concretely, for example, the OLT control part 11 finds a total value of the source queue lengths 125 in the bandwidth control table 120 and calculates a weight of each ONU according to the ratio between the total queue length value and each ONU source queue length 125, then distributes an upstream bandwidth to each ONU in the ΔTF×N period of the PON section.

In the bandwidth suppression mode, a bandwidth is allocated only when congestion occurs in any of the output ports of a GW. In the bandwidth suppression mode, the OLT control part 11 allocates a bandwidth indicated by the congestion time allowable bandwidth 122 to an ONU for which "1" is set in the congestion flag 126 in the bandwidth control table 120. Because the congestion time allowable bandwidth 122 is smaller than the bandwidth 124 allocated in the normal mode, a surplus is generated in the upstream bandwidth of the PON section if a logical path communication bandwidth going to a congestion port of a GW is reduced to a congestion time allowable bandwidth 122 from an allocated bandwidth 124. In the bandwidth suppression mode of the present invention, therefore, the OLT control part 11 reduces the total value of the congestion time allowable bandwidths 122 indicated by each table entry of which congestion flag 126 is set at "1" from the upstream bandwidth in the ΔTF×N period of the PON section and distributes the remaining bandwidth to each of other ONUs just like in the normal mode.

Figure 10:
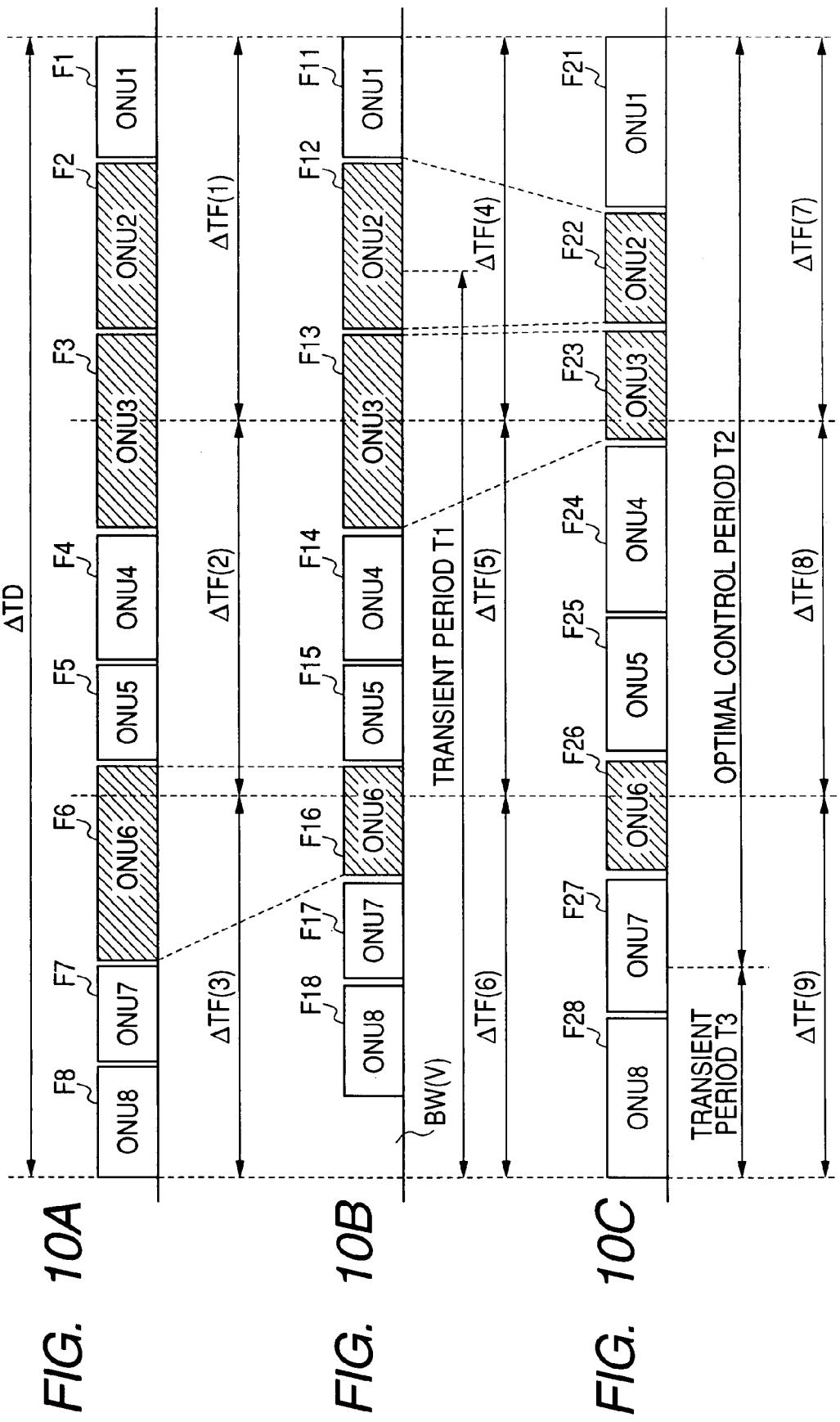
FIG. 10 is an explanatory diagram for describing bandwidth allocation by an OLT in a normal mode and in a bandwidth suppression mode.

FIG. 10 is an explanatory diagram for describing how an OLT 10 allocates a bandwidth in the normal mode and in the bandwidth suppression mode respectively.

To simplify the description, it is assumed here that 8 units of ONUs 30 are connected to an OLT 10 and the OLT control part 11 calculates a bandwidth to be allocated to each ONU in cycles of ΔTD, which is three times the basic frame cycle ΔTF (N=3). And also to make it easier to understand the difference between the bandwidth allocation in the normal mode and that in the bandwidth suppression mode, it is assumed here that each ONU transmission queue length is fixed in each period shown in FIG. 10. Each of slash-marked frames F2 (F12, F22), F3 (F13, F23), and F6 (F16, F26) represents a bandwidth allocated to the ONU 2, ONU 3 and an ONU 6 that are forwarding to a GW congestion port.

In this embodiment, the OLT control part 11 updates the value of the allocated bandwidth 124 in the bandwidth control table 120 in cycles of ΔTD and the downstream frame generation part 21 notifies each ONU of the allocated bandwidth 124 indicated in the bandwidth control table 120. The OLT control part 11, when receiving a congestion notice from the GW 50, sets "1" in the congestion flag 126 corresponding to the congestion port in the bandwidth control table 120. In this embodiment, the downstream frame generation part 21 checks the congestion flag 126 in the bandwidth control table 120 and notifies each ONU for which "0" is set in the congestion flag 126 of the allocated bandwidth 124 and notifies each ONU for which "1" is set in the congestion flag 126 of the congestion time allowable bandwidth 122.

The frame cycles ΔTF(1) to ΔTF(3) shown in (A) of FIG. 10 indicate the upstream frame transmission bandwidths of the ONU 1 to an ONU 8 allocated in the normal mode. (B) indicates an upstream frame transmission bandwidth in frame cycles ΔTF(4) to ΔTF(6) when the OLT control part 11 receives a congestion notice from the GW 50 while the ONU 2 is transmitting a frame F12.

As described above, because the OLT control part 11 updates the value of the allocated bandwidth 124 in the bandwidth control table 120 in cycles of ΔTD, the value of the allocated bandwidth 124 of each ONU is not changed in frame cycles of ΔTF(4) to ΔTF(6). In this embodiment, however, the downstream frame generation part 21 notifies each ONU for which "1" is set in the congestion flag 126 of the congestion time allowable bandwidth 122. Consequently, the bandwidth of the upstream frames streaming from the ONU 6 to a GW congestion port is reduced, thereby an empty bandwidth BW (V) is generated at the end of the frame cycle TF(6).

If the OLT control part 11 updates the value of the allocated bandwidth 124 in the bandwidth control table 120 between frame cycles ΔTF(6) and ΔTF(7), the bandwidths to be notified to ONU 1 to ONU 8 are changed in frame cycles ΔTF(6) TF(7) to ΔTF(6) TF(9) as shown in (C) of FIG. 10. Because of the bandwidth allocation in the bandwidth suppression mode, the congestion time allowable bandwidth 122 is assumed as the bandwidth of each of ONU 2, ONU 3, and ONU 6 that are transmitting upstream frames to the congestion port while the bandwidths of other ONUs that are transmitting upstream frames to normal ports increase more than in the normal mode. In FIG. 10, it is assumed that the OLT control part 11 receives a congestion reset notice from the GW 50 while the ONU 7 is transmitting an upstream frame F27. In this embodiment, transient periods T1 and T2 are generated before and after an optimal bandwidth control period T2 in the bandwidth suppression mode.

Figure 11:
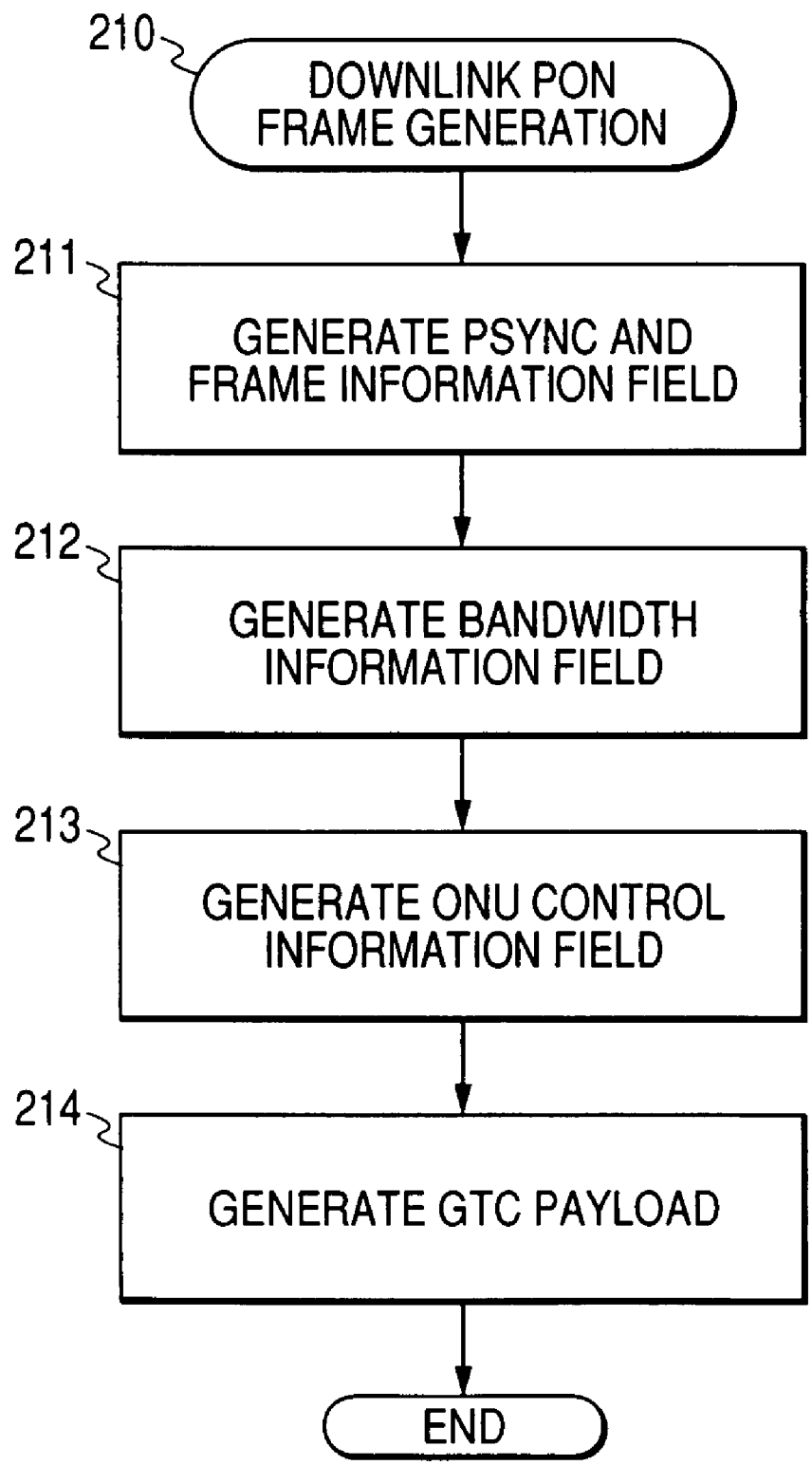
FIG. 11 is a flowchart of downstream PON frame generation processings executed by an OLT.

FIG. 11 is a flowchart of downstream PON frame generation processings 210 executed by the downstream frame generation part 21 in basic frame cycles of ΔTF (in cycles of 125 microseconds).

The downstream frame generation part 21 generates a Psync field 611, a frame information field 612 (step 211), a bandwidth information field 613 (step 212), and an ONU control information field 614 (step 213) of the GTC frame header (PCBd) shown in FIG. 2, then generates a GTC payload 62 in which a user frame read from the downstream data buffer 20 and a control frame generated by the OLT control part 11 are mapped in the GEM frame format (step 214).

Figure 12:
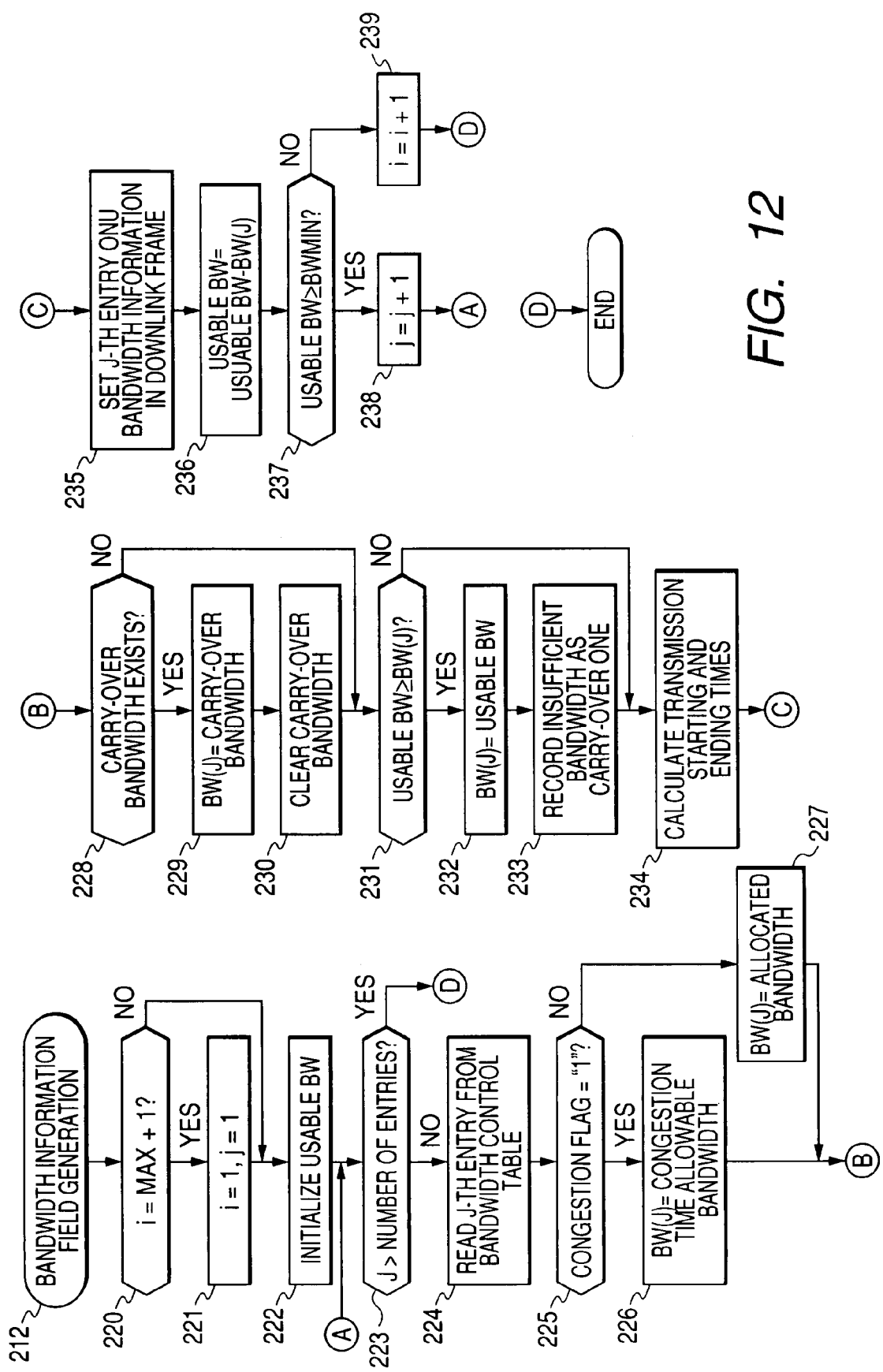
FIG. 12 is a detailed flowchart of an example of processings for generating a bandwidth information field shown in FIG. 11.

FIG. 12 is an example of a detailed flowchart of the bandwidth information field generation processings (step 212). The allocated bandwidth 124 set by the OLT control part 11 in the bandwidth control table 120 indicates an upstream bandwidth of each ONU in the ΔTF×N period. The downstream frame generation part 21 divides an allocated bandwidth 124 indicated in the bandwidth control table 120 into N×PON frames to be notified to every ONU 30 indicated with the bandwidth control ID 121 in the bandwidth control table 120.

In FIG. 12, the parameter i indicates the basic frame cycle ΔTF in a period ΔTD shown in FIG. 10 and the parameter j indicates a position of a table entry in the bandwidth control table 120. MAX indicates the number of basic frame cycles N included in a period ΔTD.

The downstream frame generation part 21 compares the value of the parameter i with "MAX+1" (step 220). If i=MAX+1 is satisfied, that is, if a new period ΔTD is set, the downstream frame generation part 21 sets "1" in the values of the parameters i and j (step 221) and initializes the total value of the bandwidths to be allocated to ONUs (usable BW) in the downstream PON frame (the first basic frame cycle) generated this time (step 222).

The downstream frame generation part 21 then compares the parameter j with the number of table entries in the bandwidth control table 120 (step 223). If the parameter j is over the number of table entries, the downstream frame generation part 21 exits the processing. If the parameter j is not over the number of table entries, the downstream frame generation part 21 reads the j-th table entry from the bandwidth control table 120 to check the congestion flag 126 (step 225). If "1" is set in the congestion flag 126, the downstream frame generation part 21 sets the value of the congestion time allowable bandwidth 122 indicated by the j-th table entry in the variable BW(j) (step 226). If "0" is set in the congestion flag 126, the downstream frame generation part 21 sets the value of the allocated bandwidth 124 indicated by the j-th table entry in the variable BW(j) (step 227).

After that, the downstream frame generation part 21 checks the carry-over bandwidth 127 of the j-th table entry (step 228). If "0" is set in the carry-over bandwidth 127, the downstream frame generation part 21 compares the usable BW with BW(j) (step 231). If "0" is not set in the carry-over bandwidth 127, the downstream frame generation part 21 sets the value of the carry-over bandwidth 127 in BW(j) (step 229) and clears the carry-over bandwidth 127 of the j-th table entry (step 230), then compares the usable BW with BW(j) (step 231).

Here, the carry-over bandwidth means a bandwidth notified to each ONU in the next basic frame period when a bandwidth (congestion time allowable bandwidth or allocated bandwidth) specified by the j-th table entry is over two basic frame cycles as shown in FIG. 10. In an actual case, however, it is possible to notify a bandwidth specified by the j-th table entry in one basic frame cycle first, then subtract the carry-over bandwidth from the usable BW in the next basic frame cycle.

If the usable BW is over BW(j), the downstream frame generation part 21 calculates both transmission starting time and transmission ending time on the basis of the BW(j) (step 234). If the usable BW is under BW(j), the downstream frame generation part 21 sets the usable BW in BW(j) (step 232) and records the insufficient bandwidth in the j-th table entry as a carry-over bandwidth (step 233), then calculates both transmission starting time and transmission ending time on the basis of the BW(j) (step 234).

After that, the downstream frame generation part 21 sets bandwidth control information that includes both transmission starting time and transmission ending time together with a bandwidth control ID indicated by the j-th table entry in a downstream PON frame (step 235), then subtracts the value of BW(j) from the usable BW (step 236) and compares the usable BW value with the predetermined bandwidth minimum value BWmin (step 237). If the usable BW value is over BWmin, the downstream frame generation part 21 increases the parameter j value (step 238) and returns the control sequence to step 223. If the usable BW value is under BWmin, the downstream frame generation part 21 increases the parameter i value (step 239) and exits the processing.

Figure 13:
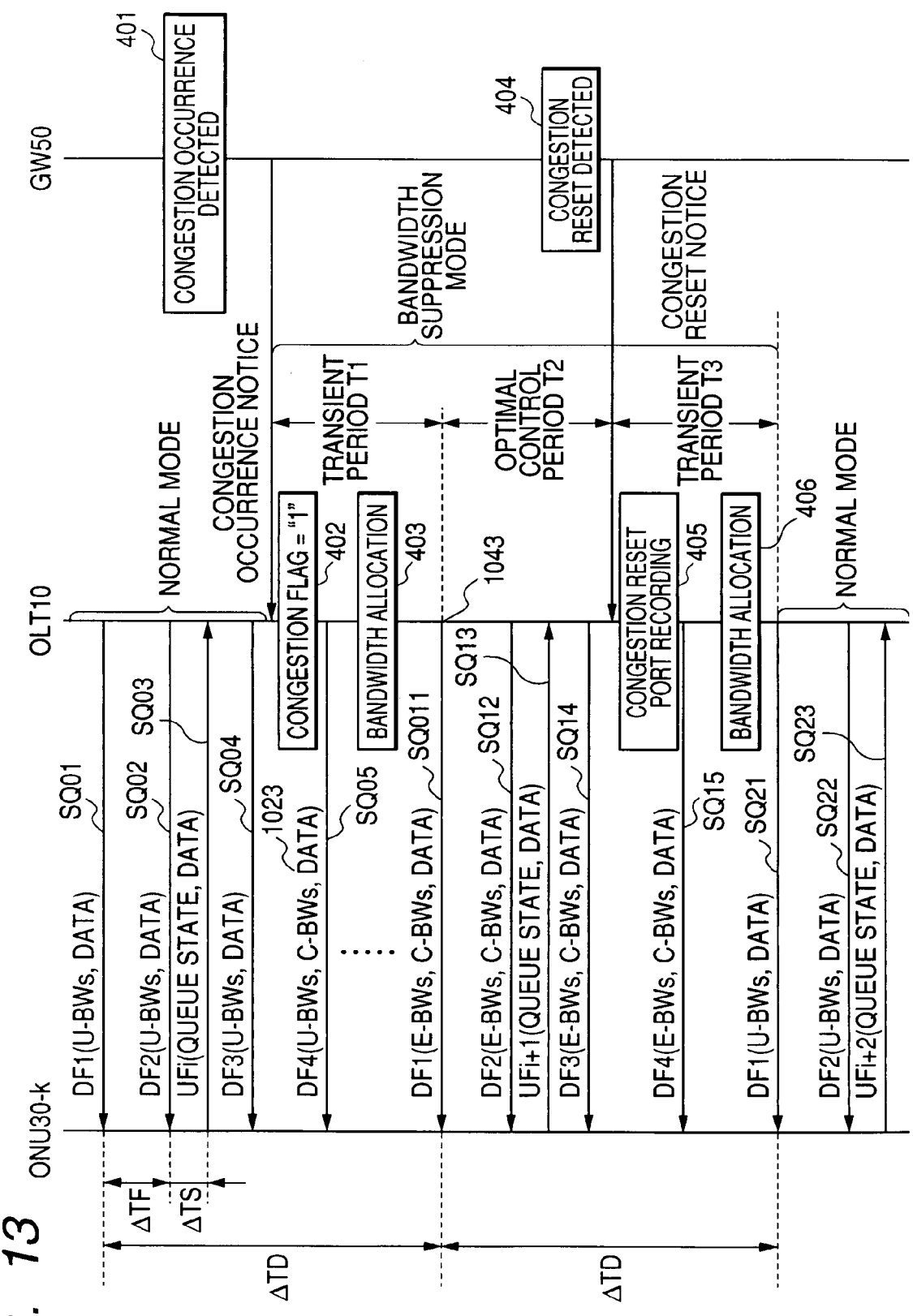
FIG. 13 is an example of a congestion control sequence executed among GW, OLT, and ONU.

FIG. 13 is a diagram for describing a congestion control sequence according to the present invention, to be executed among the GW 50, OLT 10, and ONU 30.

The GW 50 monitors the queue length QL of each output port (output line interface). If the queue length QL exceeds the threshold TH1, the GW 50 issues a back pressure control frame (congestion occurrence notice) (congestion occurrence detection 401). If the queue length QL is under the threshold value TH2, the GW 50 issues a back pressure control frame (congestion reset notice) that specifies a congestion port (congestion reset detection 404). The back pressure control frame (congestion occurrence/reset notice) is transmitted to every OLT connected to the GW 50.

The OLT 10 transmits downstream PON frames DF1, DF2, DF3, DF4, . . . in the basic frame cycles ΔTF (SQ01, SQ02, SQ04, and SQ05). While the output port of the GW 50 is normal in state, the OLT 10 notifies each ONU of a bandwidth allocated in the normal mode. The ONU 30-k connected to the OLT 10, when receiving a downstream PON frame DF2 including bandwidth control information addressed to itself, starts transmission of an upstream frame UFi at a proper timing (ΔTS) obtained by adding an equivalent delay to the transmission starting time indicated by the bandwidth control information (SQ03).

The OLT 10, when receiving a congestion occurrence notice from the GW 50, sets "1" in the congestion flag corresponding to the notified GW output port number in the congestion control table 130 and in the bandwidth control table 120 respectively (step 402). After "1" is set in the congestion flag, a period until the OLT 10 allocates a bandwidth in the band allocation cycle ΔTD (step 403) and the bandwidth control table 120 is updated becomes a transient period T1 shown in FIG. 10.

If the bandwidth control table 120 is updated while the GW 50 is in a congestion state, the bandwidth control by the OLT 10 becomes the optimal control period T2. The downstream PON frames (SQ11, SQ12, and SQ14) transmitted in the optimal control period T2 notify each ONU that uses a GW normal port of an extended allocation bandwidth (E-BWs) and notify each ONU that uses a congestion port of a congestion time allowable bandwidth (C-BWs). Consequently, if the ONU 30-k uses a congestion port, the ONU 30-k comes to transmit upstream frames UFi+1 (SQ13) in the congestion time allowable bandwidth.

The OLT 10, when receiving a congestion reset notice from the GW 50, records a congestion reset port number (step 405), then sets "0" in the congestion flag in the next allocation processing in the bandwidth allocation cycle ΔTD (step 406). Consequently, a period between when the GW 50 issues a congestion reset notice and when the OLT 10 allocates a bandwidth (step 406) becomes a transient period T3 in which a downstream PON frame (SQ15) notifies each ONU of an extended allocation bandwidth or congestion time allowable bandwidth.

If the OLT 10 that has received a congestion reset notice updates the bandwidth control table 120 once, the OLT 10 enters the normal mode in which the LOT 10 notifies each ONU with a downstream PON frame (SQ21 and SQ22) of a bandwidth (U-BWs) to be allocated normally. Consequently, the ONU 30-k for which the transmission bandwidth has been suppressed comes to be able to transmit upstream frames UFi+2 in the ordinary allocated bandwidth (SQ23).

Figure 14:
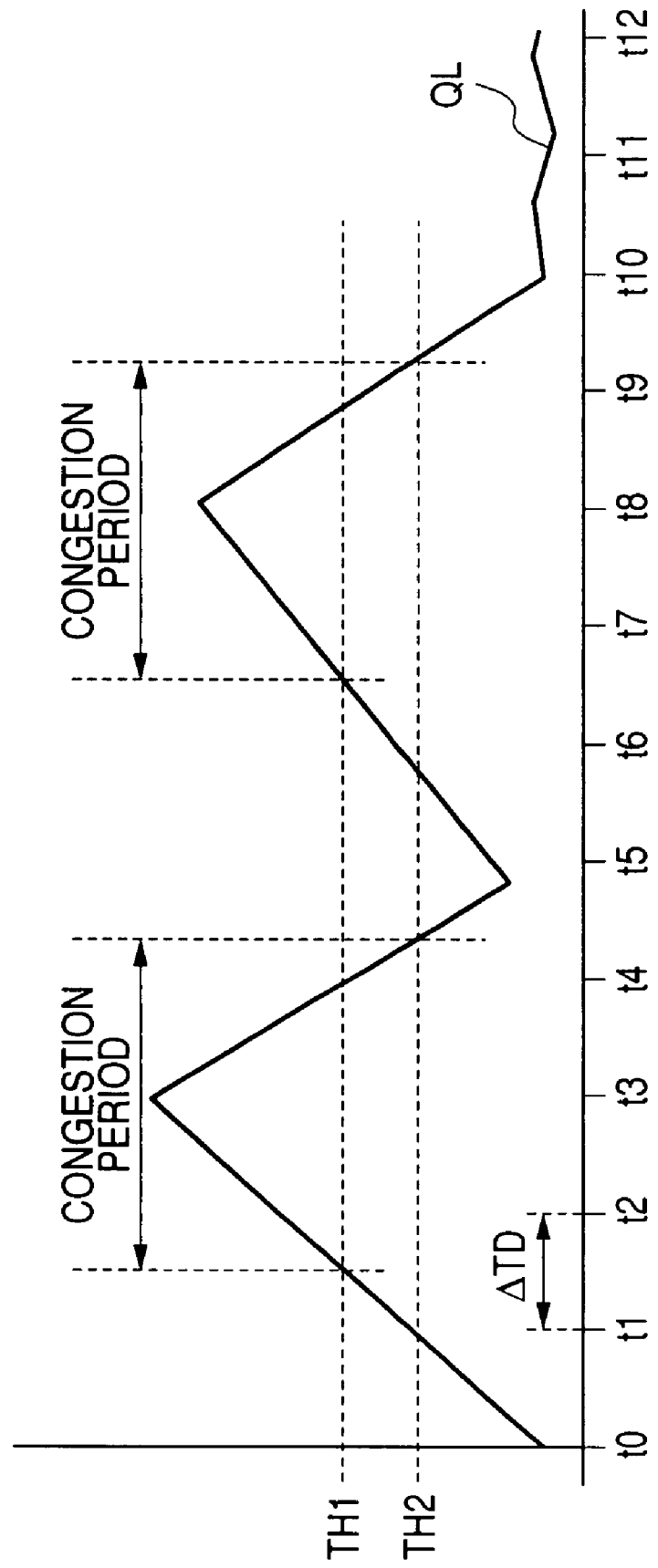
FIG. 14 is a diagram for describing a relationship between a change of a GW output frame buffer queue length and bandwidth controlling by an OLT.

FIG. 14 is a graph for describing a relationship between bandwidth controlling by the OLT 10 and a temporal change of the amount of the accumulated data (transmission queue length) in an output frame buffer 518 observed by an output frame buffer 519 of the GW 50. TH1 indicates the first threshold value for detecting congestion occurrence and TH2 indicates the second threshold value for detecting congestion reset. ΔTD indicates a period of bandwidth calculation by the OLT 10.

The GW management part 53 reads a transmission queue length QL from the output frame buffer 519 of the each output port (output line interface part) 51B of the GW 50 in a predetermined cycle, for example, in the basic frame cycle ΔTF and instructs the back pressure control frame generation part 521 to issue a congestion occurrence notification frame when the queue length QL exceeds the first threshold value TH1 and instructs the back pressure control frame generation part 521 to issue a congestion reset notification frame when the congestion occurred output port queue length QL falls below the second threshold value TH2. Consequently, the GW 50 assumes a period between congestion occurrence and congestion reset as a congestion period.

The first threshold value TH1 is set at a value smaller than the capacity of the output frame buffer 518. Thus the congestion occurrence notification frame is issued before the output frame buffer becomes full. And the capacity of the output frame buffer 518 remains still enough to absorb an increase of the queue length until each OLT 10 suppresses the bandwidth in response to a congestion occurrence notice. Receiving a congestion occurrence notice from the GW 50, the OLT control part 11 controls the bandwidth allocated to each ONU in the bandwidth suppression mode consisting of the above described transient periods T1 and T3, as well as the optimal control period T3.

Figure 15:
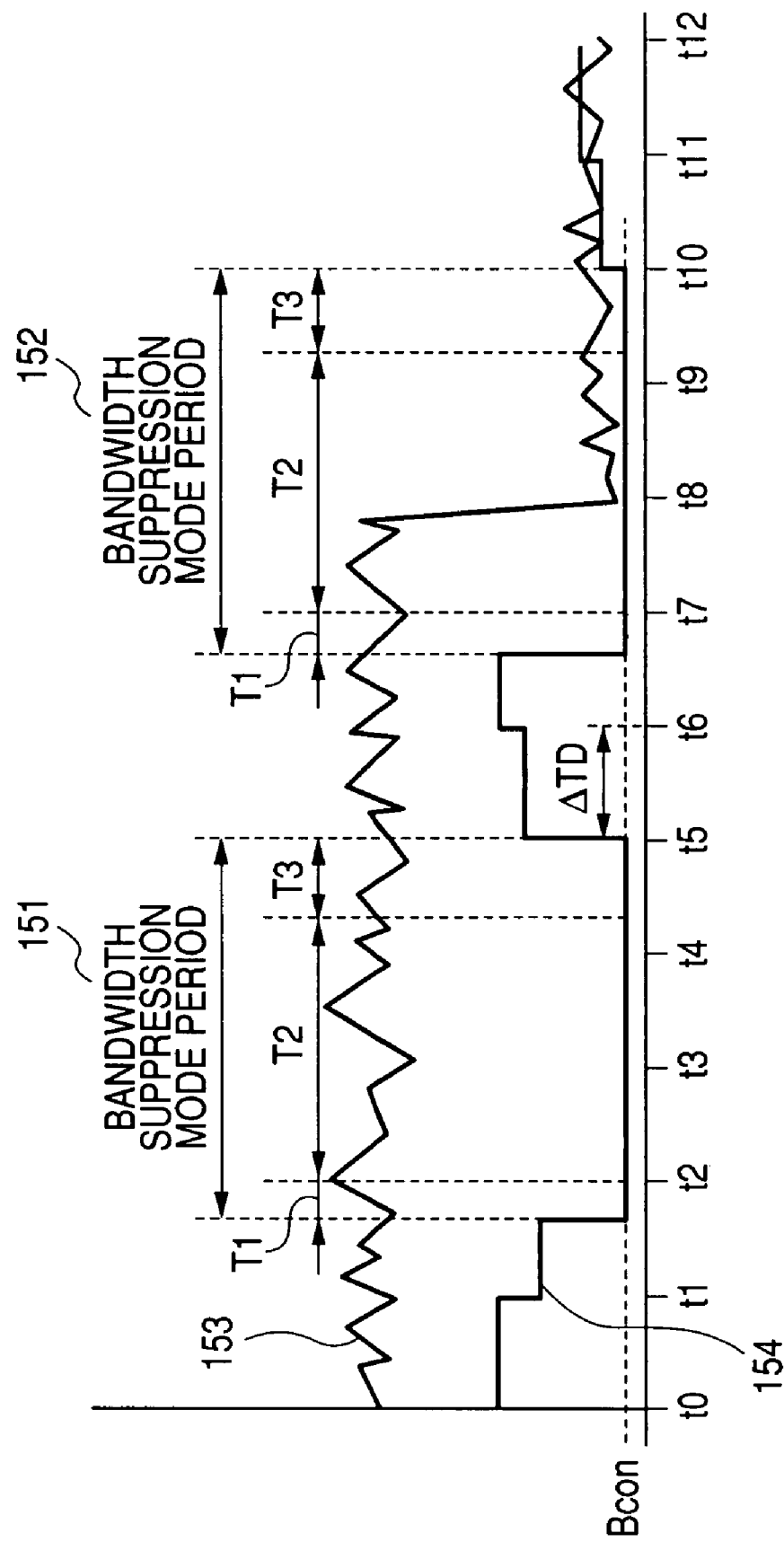
FIG. 15 is an explanatory graph for describing temporal changes of a transmission queue length and an allocated bandwidth in an ONU that is transmitting a frame that passes a GW congestion port.

FIG. 15 is an explanatory diagram for describing the bandwidth suppression mode periods 151 and 152 in an OLT 10 and the temporal changes of both transmission queue length 153 and allocated bandwidth 154 in an ONU that is transmitting frames that have passed a congestion occurred GW port (hereunder, to be referred to as a congestion path ONU).

Figure 16:
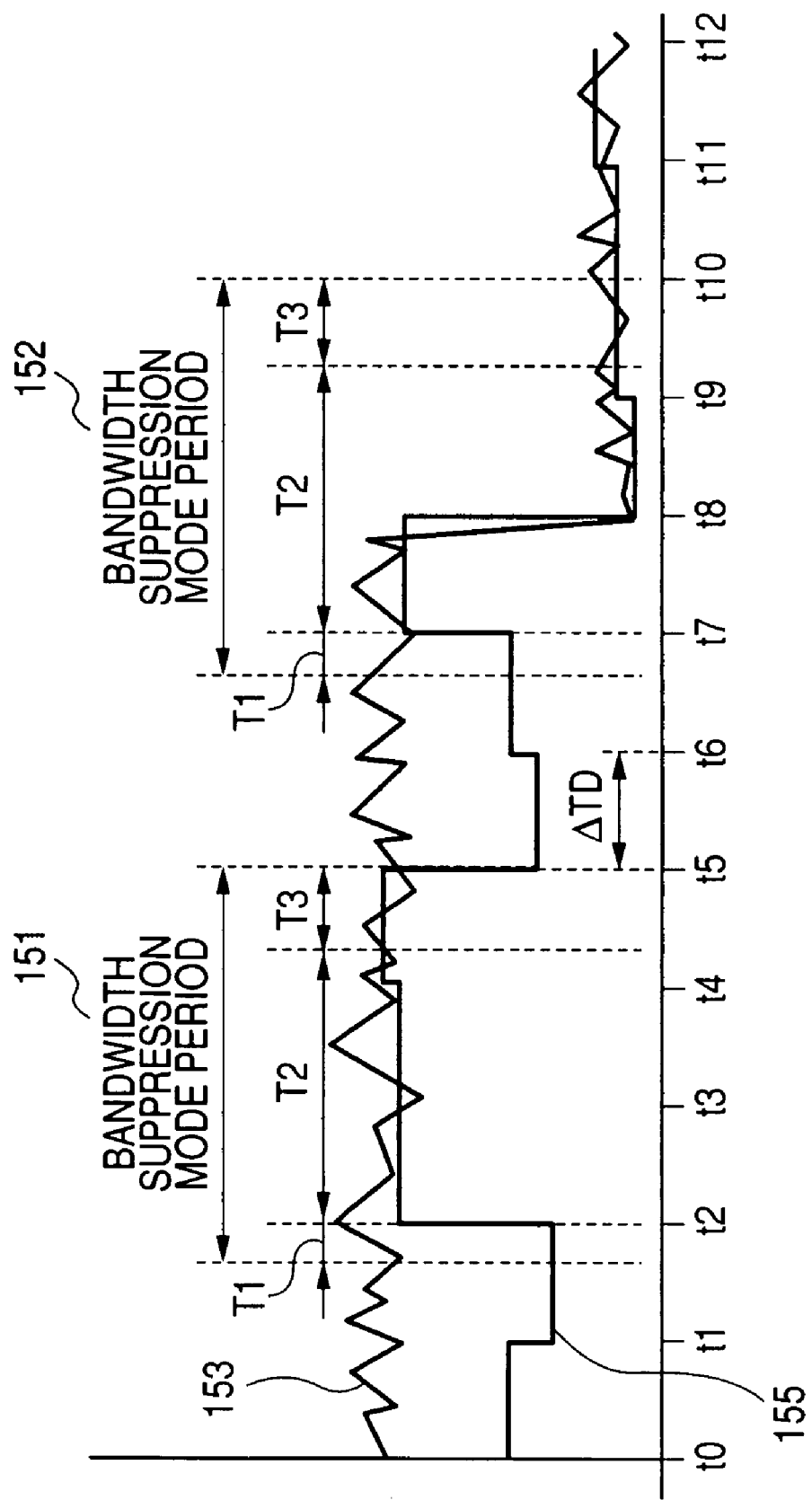
FIG. 16 is an explanatory graph for describing temporal changes of a transmission queue length and an allocated bandwidth in an ONU that is transmitting a frame that passes a normal port of a GW.

FIG. 16 is an explanatory graph for describing the bandwidth suppression mode periods 151 and 152 in an OLT 10 and the temporal changes of both transmission queue length 153 and allocated bandwidth 155 in an ONU that is transmitting frames that have passed a normal GW port (hereunder, to be referred to as a normal path ONU).

In order to make it easier to understand the effect of the bandwidth controlling according to the present invention, assume here that the transmission queue length is changed in the same way in both normal path ONU and congestion path ONU and only the change of an allocated bandwidth is checked between those ONUs. The bandwidth controlling in the OLT control part 11 is affected on each ONU just with a delay of the basic frame cycle ΔTF. In any period other than the periods 151 and 152 in the bandwidth suppression mode, an allocated bandwidth BW(j) is notified to each ONU according to the transmission queue length 153 calculated as a bandwidth in the normal mode.

A period between when the OLT control part 11 enters a bandwidth suppression mode period 151 between times t1 and t2 and when the next bandwidth is allocated becomes a transient period T1. If the next allocated bandwidth is notified to a congestion path ONU in the transient period T1, the congestion path ONU bandwidth is suppressed to the congestion time allowable bandwidth Bcon within the transient period T1 as shown in FIG. 15. If the OLT control part 11 allocates a bandwidth just before the time t2, the bandwidth suppression mode enters the optimal control period T2. In this embodiment, the bandwidth allocated to a congestion path ONU is kept at the congestion time allowable bandwidth Bcon and this state is continued even after the bandwidth suppression mode goes into the transient period T3 after the GW output port goes out of the congestion state. The congestion path ONU bandwidth returns to a bandwidth allocated according to the transmission queue length SQ when the bandwidth controlling of the OLT 10 goes into the normal mode.

According to the present invention, because only the bandwidth allocated to a congestion path ONU is deleted when the OLT 10 enters the bandwidth suppression mode, each normal path ONU is allocated a bandwidth as usually in a transient period T1 of the bandwidth suppression mode as shown in FIG. 16. When the bandwidth suppression mode of the OLT control part 11 enters the optimal control period T2, a surplus bandwidth generated in the PON section due to the deletion of the congestion path ONU is distributed to each of plural normal path ONUs according to the transmission queue length. Consequently, as shown in FIG. 16, in the optimal control period T2, the bandwidth to be allocated to each normal path ONU increases. However, because a bandwidth for each normal path ONU is allocated just like in the normal mode according to the transmission queue length, the allocated bandwidth is reduced in proportion to the reduction of the transmission queue length SQ as shown at the time t8.

In the embodiment described above, the OLT control part 11 keeps the congestion path ONU bandwidth at the congestion time allowable bandwidth Bcon in the bandwidth suppression mode period. However, it is also possible to allocate a bandwidth to the congestion path ONU according to the source queue length within the congestion time allowable bandwidth. In the same way, it is also possible to allocate a bandwidth to each normal path ONU according to the source queue length within the maximum control bandwidth 123 indicated in the bandwidth control table 120.

In this embodiment, the congestion time allowable bandwidth of each ONU is given as a fixed value. However, the allowable bandwidth may be a dynamic value obtained by multiplying the value of a bandwidth allocated to each ONU before the congestion occurs by a predetermined reduction rate.

Although a back pressure control frame generation part 521 is provided for each output line interface part 51B of the GW 50 and the back pressure control frame generation part 521 generates both congestion occurrence notification frame and congestion reset notification frame according to the commands from the GW management part 53 in the above embodiment, the GW management part 53 may generate the back pressure control frames (congestion occurrence notification frame and congestion reset notification frame).

In such a case, a back pressure control frame buffer is provided for each output line interface part 51B instead of the back pressure control frame generation part 521 and for example, an OLT connection port number, a connection port MAC address, an OLT MAC address corresponding to a GW output port number respectively are recorded in the management information table 54 beforehand. The GW management part 53 thus refers to the management information table 54 when detecting congestion occurrence in an output port Pi to generate a back pressure control frame and output the control frame to the back pressure control frame buffer of the output line interface part 51B corresponding to the OLT connection port number. The output frame reading part 520 is allowed to read and transmit frames according to the priority given to the back pressure control frame buffer over the output frame buffer 518.

Second Embodiment

Figure 17:
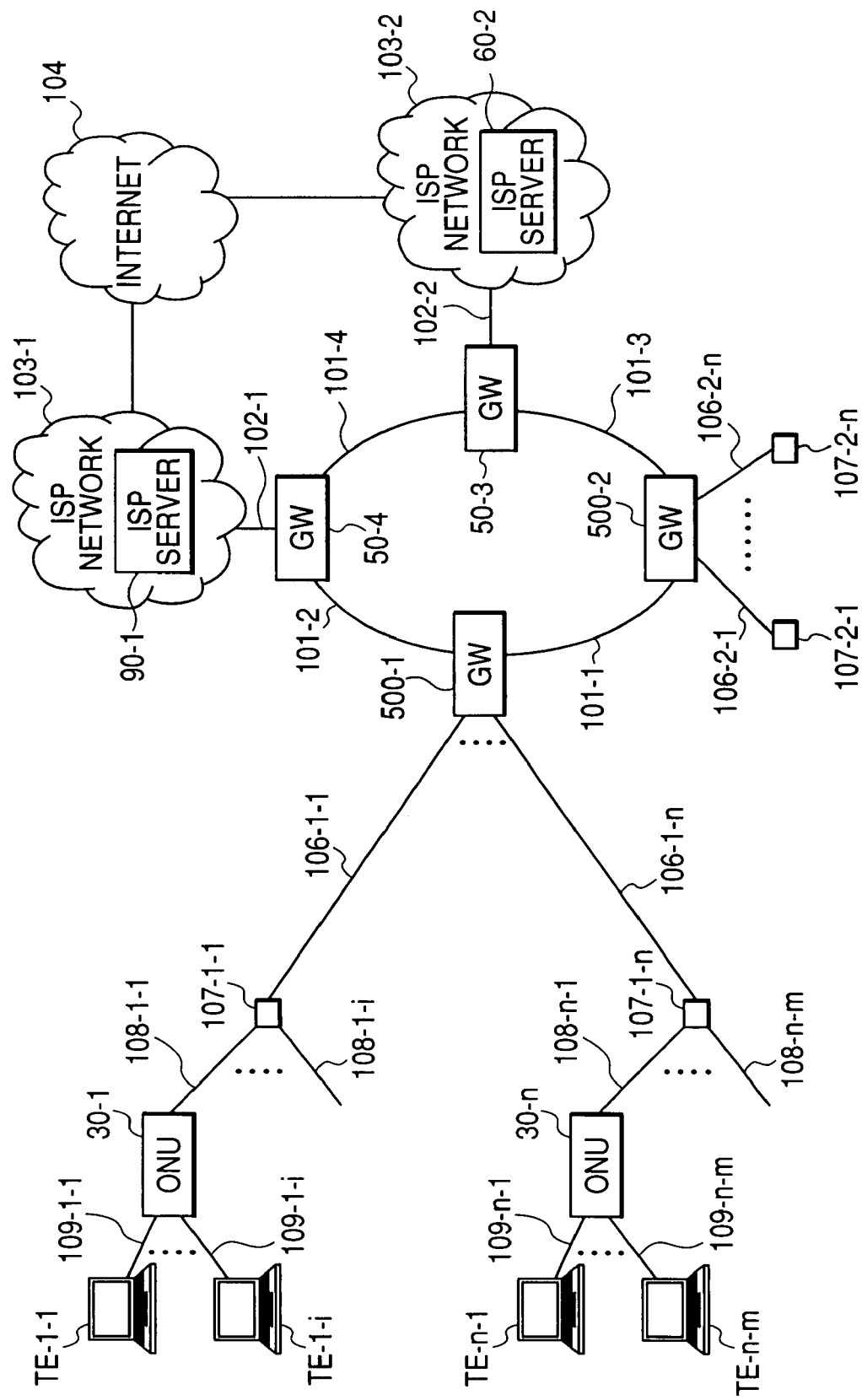
FIG. 17 is a configuration of a communication network to which the present invention applies in another embodiment.

FIG. 17 is another embodiment of the network to which the present invention applies.

In this embodiment, GWs 500-1 and 500-2 of a carrier network are provided with a line interface (PON interface) having OLT functions respectively and houses PON optical fibers 106 (106-1-1 to 106-2-n) directly.

Figure 18:
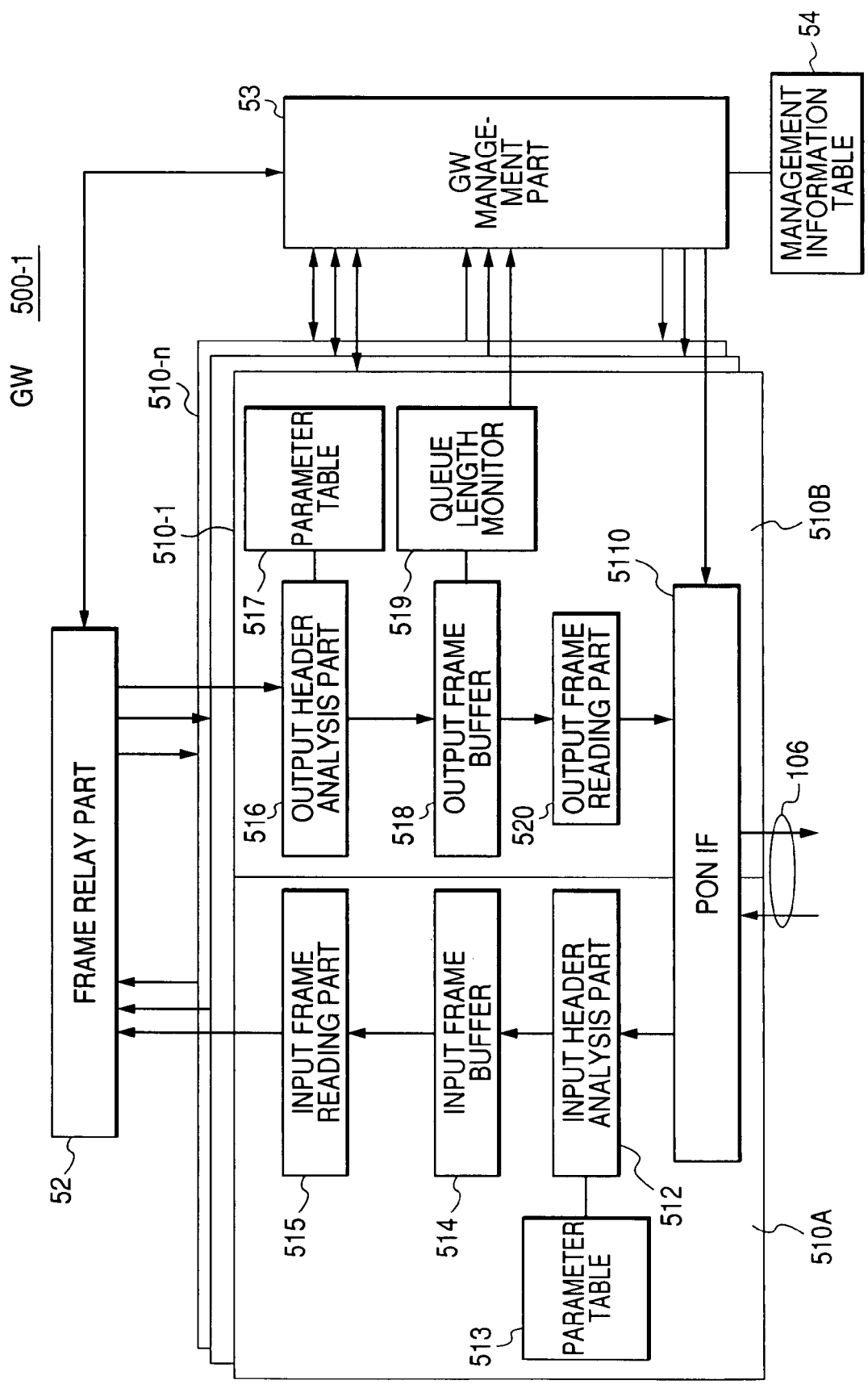
FIG. 18 is a block diagram of a configuration of a GW 500-1 shown in FIG. 17.
Figure 19:
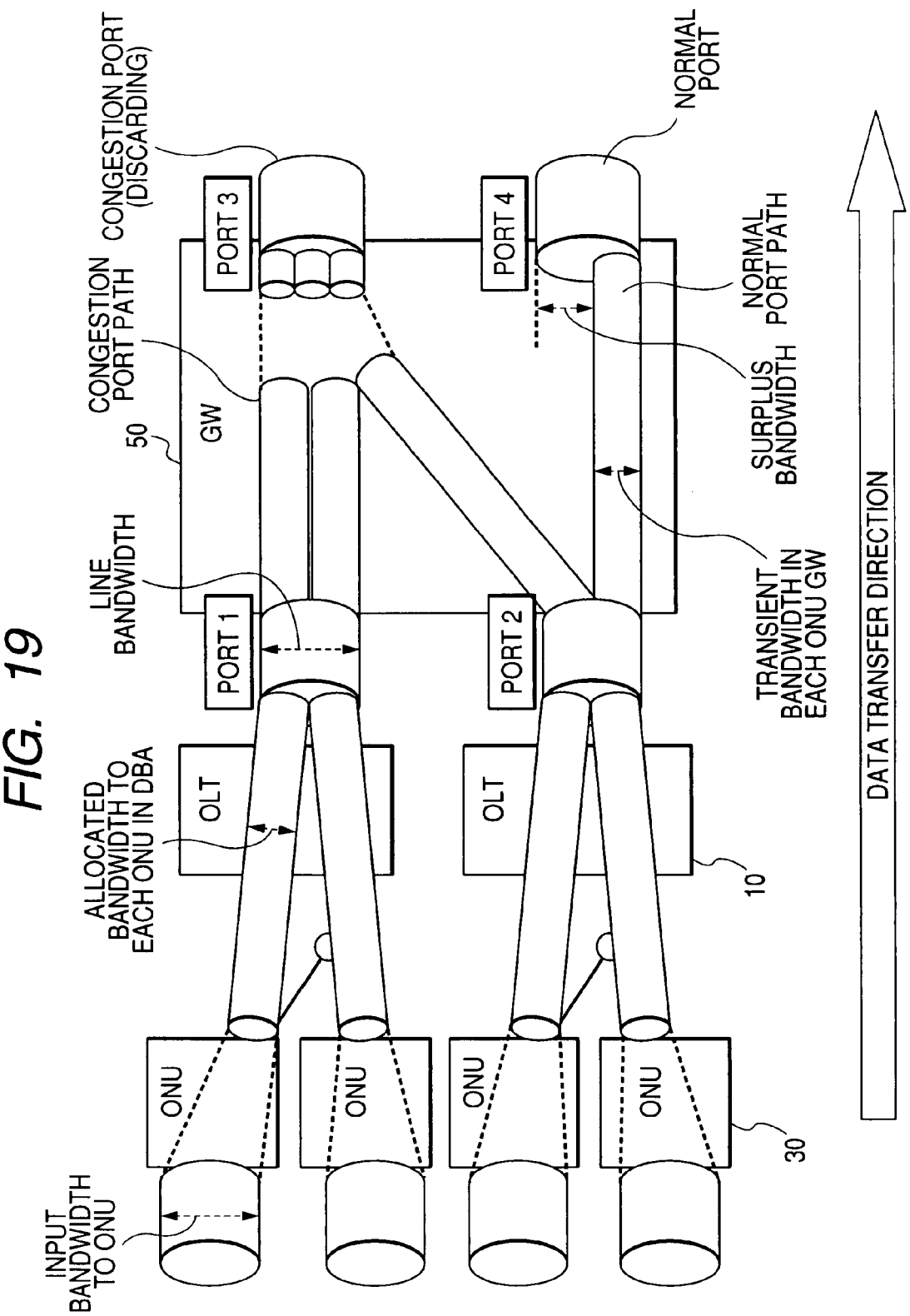
FIG. 19 is an explanatory diagram for describing a place where a frame is to be discarded in a GW and how a bandwidth is used in each place according to an employed conventional bandwidth controlling method.
Figure 20:
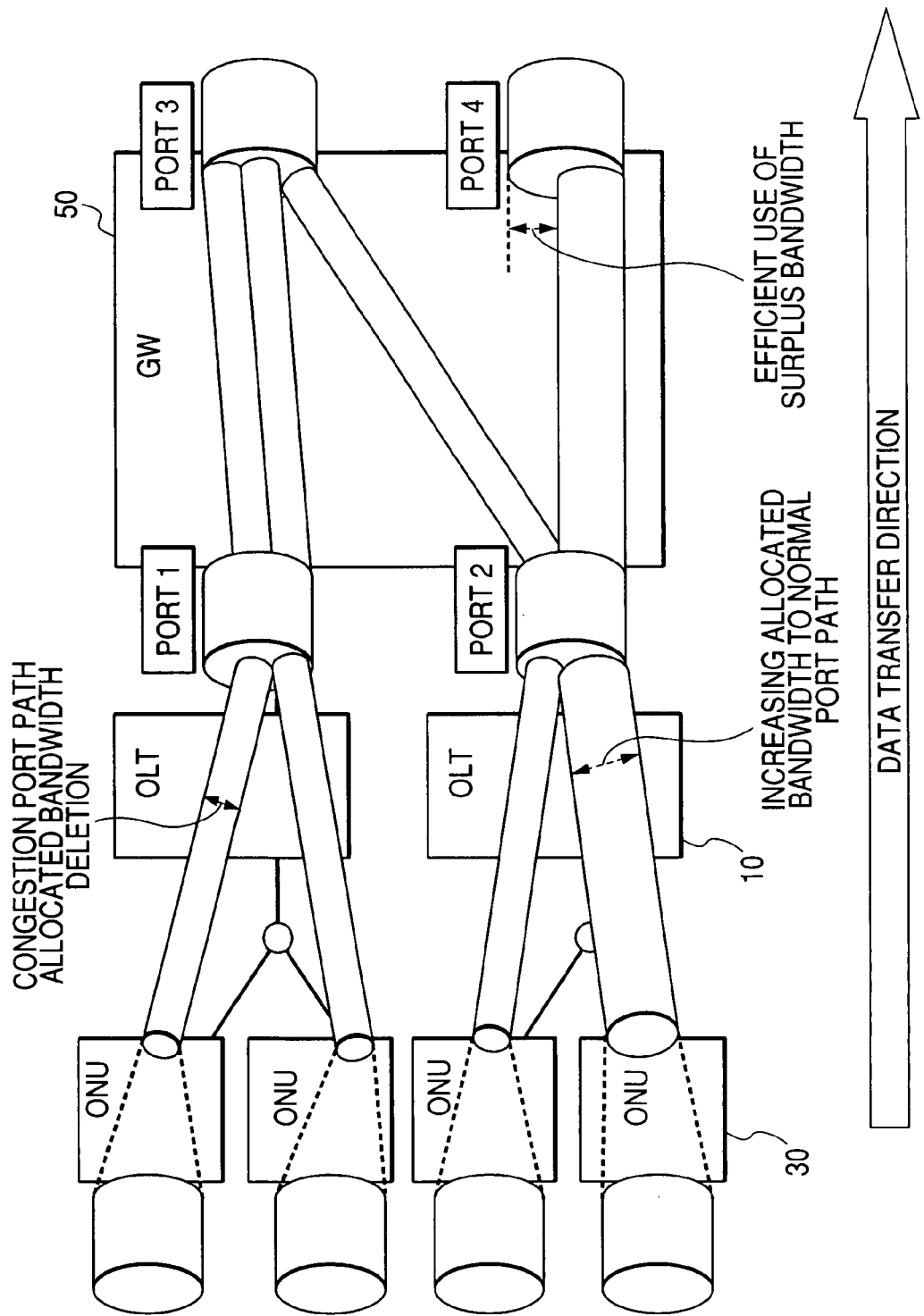
FIG. 20 is an explanatory diagram for describing a place where a frame is to be discarded and how a bandwidth is used in each place in a GW to which the present invention applies.

FIG. 18 is a configuration of the GW 500-1.

The GW 500-1 consists of plural network interface parts 510 (510-1 to 510-q), a frame relay part 52 for connecting those interface parts 510 to each other, a GW management part 53, and a management information table 54. The network interface part 51-1 for housing the PON optical fiber 106 is provided with a PON interface (IF) 5110 instead of the Ethernet IF 511 shown in FIG. 8. The network interface part for housing the carrier network lines 101 (101-1 and 101-2) is provided with an Ethernet IF 511 shown in FIG. 8.

The PON interface (IF) 5110 is the same as that of the OLT 10 shown in FIG. 4 except for that the Ethernet IF 14, the upstream frame transmission part 18, and the frame analysis part 19 are excluded from the configuration. And the OLT control part 11 is connected to the GW management part 53 in this embodiment.

According to this embodiment, because the OLT control part 11 can receive both congestion occurrence notice and congestion reset notice from the GW management part 53 directly, it is possible to omit the management of the destination MAC address required for generating a back pressure control frame shown in FIG. 3. Furthermore, according to this embodiment, because the OLT control part 11 can quickly reduce a bandwidth allocated to a congestion path ONU when congestion occurs in an output port in a GW, it is possible to quicken avoiding of congestion with a back pressure for the congestion path ONU, thereby the GW output frame buffer memory can be reduced in capacity.

Although an example of application to the G-PON has been described in the first and second embodiments, the bandwidth controlling of the present invention may also apply to other types of PON, for example, to the GE-PON.

What is claimed is:

1. A PON (Passive Optical Network) system, comprising:
an optical line terminal (OLT);
a plurality of optical network units (ONU) connected to the OLT through a passive optical network (PON) respectively; and
a gateway (GW) connected to the OLT through a communication line;
wherein the OLT includes:
a congestion control table that records a relationship between an output port number of the GW and an identifier (ID) of an ONU that uses the GW output line identified with the output port number;
an OLT control part that records a transmission queue length notified in an upstream PON frame from each of the plurality of ONUs beforehand and allocates a bandwidth distributed to each of the plurality of ONUs dynamically as the next upstream frame transmission bandwidth in a PON section according to its transmission queue length; and
a downstream frame generation part that generates a downstream frame including bandwidth control information indicating an upstream frame transmission bandwidth for each ONU according to a frame transmission bandwidth allocated by the OLT control part, wherein the OLT control part, when receiving a congestion occurrence notice indicating a number of the output port in which congestion occurred (congestion occurred output port number) from the GW, identifies the ONU identifier corresponding to the congestion output port number in the bandwidth control table and shifts the current PON section bandwidth control in a normal mode for allocating a bandwidth to that in a bandwidth suppression mode for allocating a congestion time allowable bandwidth that is less than the current bandwidth to an ONU having the identified ONU ID and allocating a bandwidth to each of other ONUs according to its transmission queue length.

2. The PON system according to claim 1, wherein the OLT control part includes a bandwidth control table for recording a transmission queue length notified from an ONU, an allocated bandwidth calculated in a predetermined cycle according to the transmission queue length, and a congestion flag corresponding to each of the plurality of ONUs respectively, and wherein the PON system, when receiving the congestion occurrence notice from the GW, changes the state of a congestion flag corresponding to an ONU ID identified in the bandwidth control table to a congestion display state and allocates a bandwidth to each ONU of which congestion flag state is normal according to its transmission queue length during bandwidth controlling in the bandwidth suppression mode and allocates the congestion time allowable bandwidth to each ONU of which congestion flag indicates the congestion display state.

3. The PON system according to claim 2, wherein the downstream frame generation part generates bandwidth control information for each ONU according to the state of its congestion flag set in the bandwidth control table and notifies each ONU of which congestion flag indicates the normal state of a bandwidth to be allocated according to the transmission queue length in each of the downstream PON frames and notifies each ONU of which congestion flag indicates the congestion display state of the congestion time allowable bandwidth.

4. The PON system according to claim 3, wherein the bandwidth control table records a fixed value predetermined for each ONU as the congestion time allowable bandwidth, and wherein the downstream frame generation part applies a congestion time allowable bandwidth indicated in the bandwidth control table as bandwidth control information for each ONU of which congestion flag indicates the congestion display state.

5. The PON system according to claim 2, wherein the OLT control part, when receiving a congestion reset notice indicating a number of the output port of which congestion is reset (congestion reset output port number) from the GW, identifies the identifier of an ONU corresponding to the congestion reset output port number in the bandwidth control table beforehand, then sets normal state in the congestion flag corresponding to the identified ONU identifier in the bandwidth control table.

6. The PON system according to claim 2, wherein the OLT control part calculates a new bandwidth to be allocated to each ONU in a cycle ΔTD that is N (N is an integer) times the cycle of downstream PON frames generated in the downstream frame generation part, and wherein the downstream frame generation part divides the plurality of ONUs into N groups and change groups for each downstream PON frame to transmit bandwidth control information to each of the plurality of ONUs.

7. A PON system, comprising:

an optical line terminal (OLT);

a plurality of optical network units (ONU) connected to the OLT through a passive optical network (PON); and a gateway (GW) connected to the OLT through a communication line, wherein the OLT includes:

a congestion control table that records a relationship between an output port number of the GW and an identifier (ID) of an ONU that uses the GW output line identified with the output port number;

an OLT control part that records a transmission queue length notified in an upstream PON frame from each of the plurality of ONUs beforehand and allocates a bandwidth distributed to each of the plurality of ONUs dynamically as the next upstream frame transmission bandwidth in a PON section according to each transmission queue length; and a downstream frame generation part that generates a downstream frame including bandwidth control information indicating an upstream frame transmission bandwidth for each ONU according to a frame transmission bandwidth allocated by the OLT control part, wherein the OLT control part usually controls bandwidths in a normal mode for distributing a PON bandwidth in a predetermined period to each of the plurality of ONUs according to its queue length, and wherein the OLT control part, when receiving a congestion occurrence notice indicating a number of the output port in which congestion occurred (congestion occurred output port number) from the GW, shifts the current PON section bandwidth controlling in the normal mode to that in a bandwidth suppression mode for allocating a congestion time allowable bandwidth that is less than the current bandwidth to a specific ONU having an ONU identifier corresponding to the congestion occurred output port number identified in the bandwidth control table and allocating a bandwidth to each of other ONUs according to its transmission queue length.

8. The PON system according to claim 7, wherein the OLT control part allocates a congestion time allowable bandwidth to the identified ONU during bandwidth controlling in the bandwidth suppression mode and distributes a remaining bandwidth in the predetermined period to each of the other ONUs according to its transmission queue length.

9. The PON system according to claim 8, wherein bandwidth controlling in the bandwidth suppression mode is executed in two different periods, one is a transient period in which a congestion time allowable bandwidth is allocated to the identified ONU and a bandwidth calculated in the normal mode is allocated to each of the other ONUs and the other is an optimal control period in which a congestion time allowable bandwidth is allocated to the identified ONU and a remaining bandwidth in the predetermined period is distributed to each of the ONUs according to its transmission queue length.

10. The PON system according to claim 9, wherein the OLT control part repeats calculating of a new allocation bandwidth in both the normal mode and the bandwidth suppression mode respectively in a cycle longer than the cycle for generating downstream frames in the downstream frame generation part, and wherein the OLT control part, when receiving a congestion reset notice indicating a congestion reset output port number from the GW, identifies the identifier of an ONU corresponding to the congestion reset output port number in the bandwidth control table, then sets a normal state in the congestion flag corresponding to the identified ONU identifier in the bandwidth control table at the time of the next allocation bandwidth calculation.

* * * * *